US009313778B2

(12) United States Patent
Ihara et al.

(10) Patent No.: US 9,313,778 B2
(45) Date of Patent: Apr. 12, 2016

(54) FREQUENCY SELECTION METHOD AND COGNITIVE WIRELESS SYSTEM

(71) Applicant: TOYOTA JIDOSHA KABUSHIKI KAISHA, Toyota-shi (JP)

(72) Inventors: Yutaka Ihara, Tokyo (JP); Onur Altintas, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 6 days.

(21) Appl. No.: 14/357,471

(22) PCT Filed: Nov. 7, 2012

(86) PCT No.: PCT/JP2012/078852
§ 371 (c)(1),
(2) Date: May 9, 2014

(87) PCT Pub. No.: WO2013/069688
PCT Pub. Date: May 16, 2013

(65) Prior Publication Data
US 2014/0315565 A1    Oct. 23, 2014

(30) Foreign Application Priority Data

Nov. 11, 2011 (JP) .................................. 2011-247996

(51) Int. Cl.
*H04W 72/00* (2009.01)
*H04W 24/00* (2009.01)
(Continued)

(52) U.S. Cl.
CPC ........... *H04W 72/0406* (2013.01); *G08G 1/056* (2013.01); *G08G 1/094* (2013.01);
(Continued)

(58) Field of Classification Search
CPC ....... G01S 13/04; G01S 13/58; G01S 13/345; G01S 13/584; G01S 13/931; G01S 17/42; G01S 17/936; G01S 3/74; G01S 7/415; H04W 4/028

USPC ......................... 342/107, 109, 118, 146, 147; 455/404.2, 456.1–457; 701/300
See application file for complete search history.

(56) References Cited

U.S. PATENT DOCUMENTS 9,055,593 B2 *   6/2015   Kim et al.
2006/0167625 A1*  7/2006   Jung et al. .................... 701/209
(Continued)

FOREIGN PATENT DOCUMENTS

JP          2009-200773 A        9/2009

OTHER PUBLICATIONS

"Proposal by Google Inc. to provide a TV Band Device Database Management Solution", Google Inc. Jan. 4, 2010, 20 pages.
(Continued)

*Primary Examiner* — Rafael Pérez-Gutiérrez
*Assistant Examiner* — Mark G. Pannell
(74) *Attorney, Agent, or Firm* — Oblon, McClelland, Maier & Neustadt, L.L.P.

(57) ABSTRACT

A frequency to be used in a cognitive wireless system is determined appropriately. A DB apparatus manages white spaces (WS) for each frequency, and calculates and reports, to a mobile terminal, WS vectors (distances from a mobile terminal location to an interference area in the four directions, north, south, east and west) for each frequency. The mobile terminal refers to the WS vectors and uses a frequency providing the longest available distance in a direction of movement. The available distance is calculated by interpolation (triangular interpolation, elliptical interpolation, rectangular interpolation) of WS boundaries using various methods. Desirably, the mobile terminal reports a direction of movement to the DB apparatus, and the DB apparatus reports the distance to an interference area only in the two directions near to the direction of movement. Furthermore, desirably, information indicating whether the interference areas in the two directions are the same area or different areas is added to the WS vectors, and the interpolation method employed by the mobile terminal is changed in accordance with this information.

20 Claims, 20 Drawing Sheets

(51) Int. Cl.
- *H04W 72/04* (2009.01)
- *H04W 16/14* (2009.01)
- *G08G 1/056* (2006.01)
- *G08G 1/09* (2006.01)
- *H04L 5/00* (2006.01)
- *H04W 72/10* (2009.01)
- *H04W 64/00* (2009.01)
- *H04W 4/02* (2009.01)

(52) U.S. Cl.
CPC ............ *H04L 5/0066* (2013.01); *H04W 16/14* (2013.01); *H04W 72/10* (2013.01); *H04W 4/028* (2013.01); *H04W 64/006* (2013.01)

(56) References Cited

U.S. PATENT DOCUMENTS

| | | | |
|---|---|---|---|
| 2010/0211301 A1* | 8/2010 | McClellan | 701/119 |
| 2010/0323694 A1 | 12/2010 | Altintas | |
| 2011/0187744 A1* | 8/2011 | Kim et al. | 345/633 |
| 2011/0248867 A1* | 10/2011 | Lee et al. | 340/905 |
| 2011/0307210 A1* | 12/2011 | Stevens et al. | 702/150 |
| 2012/0254084 A1* | 10/2012 | Richter et al. | 706/14 |
| 2014/0066074 A1* | 3/2014 | Folke et al. | 455/437 |
| 2014/0220901 A1* | 8/2014 | Selen et al. | 455/63.1 |
| 2014/0228065 A1* | 8/2014 | Almeida et al. | 455/509 |
| 2014/0328294 A1* | 11/2014 | Malkov et al. | 370/329 |
| 2014/0347393 A1* | 11/2014 | Inoue et al. | 345/633 |
| 2015/0133138 A1* | 5/2015 | Bhat et al. | 455/452.1 |

OTHER PUBLICATIONS

Onur Altintas, et al., "Database Assisted Vehicle-to-Vehicle Communications over TV White Space", SDR-WInnComm 2014 (Wireless Innovation Forum Conference on Wireless Communications Technologies and Software Defined Radio), Mar. 11-13, 2014, 5 pages.

Kei Inage, et al., "White Space Vectors for Channel Selection in Vehicular Cognitive Networks", IEEE VNC 2011 (Vehicular Networking Conference), Nov. 14-16, 2011, 7 pages.

\* cited by examiner (A)

(B)

(A) TRIANGULAR INTERPOLATION (B) ELLIPTICAL INTERPOLATION (C) RECTANGULAR INTERPOLATION (A)

(B)

(A)

(B)

(A)

(B)

(*) AD BIT: ADJACENT DETERMINATION BIT (A)

(B)

FREQUENCY SELECTION METHOD AND COGNITIVE WIRELESS SYSTEM

TECHNICAL FIELD

The present invention relates to frequency selection technology in a cognitive wireless system.

BACKGROUND ART

In order to increase frequency usage efficiency, research into cognitive wireless technology has been advanced, wherein a wireless communication apparatus recognizes and identifies a surrounding electromagnetic wave environment, and adaptively changes the frequency, wireless method and the like, used for wireless communications. In particular, a mode has been conceived in which unlicensed users (secondary users) are able to use frequencies that have been allocated to licensed users (primary users) but are not actually in use. A frequency of this kind is called a secondarily usable frequency, or a "white space". When a secondary user is to use a white space of this kind, it is necessary to determine the available frequencies and to determine which of the frequencies is desirable to use.

In recent years, the use of spectrum (white space) databases has been investigated in order to assist rapid decision-making about the available frequencies (Non-Patent Document 1). By acquiring an available frequency from such a database, a secondary user can expect a rapid decision about the frequency to be used for communication.

Furthermore, the application of cognitive wireless technology using white spaces to vehicular (moving object) communications has also been investigated. The characteristic features of cognitive wireless technology for vehicular communications is that the location of the vehicle changes frequently, and consequently the available frequencies change frequently.

Patent Document 1: Japanese Patent Application Publication No. 2009-200773

Non-Patent Document 1: Google Inc. "Proposal by Google Inc. to Provide a TV Band Device Database Management Solution", [online], (retrieved on 17 Oct., 2011), (URL: http://www.scribd.com/doc/24784912/01-04-10-Google-White-Spaces-Database-Proposal)

SUMMARY OF INVENTION

Technical Problem

However, the white space database described in Non-Patent Document 1 supposes that the information delivery destination is a fixed terminal, and a method of providing information to a high-speed moving terminal, such as a vehicle, has not yet been investigated. With the movement of a vehicle, the secondarily usable frequencies change dramatically, both temporally and spatially. In order to transmit these changes to the database, it is necessary to transmit information efficiently, since the amount of information involved is enormous.

In order to achieve efficient transfer of information, the white space information may be compressed (to reduce the amount of information) before transmission, but in so doing, the details of the information are lost, and the secondary user becomes unable to acquire accurate white space information. As a result of this, problems arise in that interference occurs with primary users, and it becomes necessary, conversely, to switch the used channel excessively. Therefore, a selection method which is capable of both compressing information in a way that suppresses decline in the accuracy of frequency selection, and making a suitable frequency selection on the basis of the compressed information, is desired.

It is an object of the present invention to enable the efficient provision of white space information to a mobile terminal from a database apparatus having white space information, and the suitable selection of a frequency to be used for communication, in the mobile terminal.

Solution to Problem

The frequency determination method according to the present invention is a frequency determination method for determining a frequency to be used for communication by a mobile communication apparatus, in a wireless communications system including a database apparatus which stores, for each frequency, a prohibited area which is an area where a licensed user is using radio waves, and the mobile communication apparatus which is capable of wireless communications with the database apparatus.

The frequency determination method according to the present invention includes: a step in which the mobile communication apparatus acquires location information of a host apparatus; a step in which the mobile communication apparatus reports the location information to the database apparatus; a step in which the database apparatus generates distance information for each frequency; a step in which the database apparatus reports the distance information for each frequency, to the mobile communication apparatus; and a step in which the mobile communication apparatus determines a frequency to be used for communication, on the basis of the reported distance information and the direction of movement of the mobile communication apparatus. Here, the distance information is information including a first distance, which is a distance in a first direction to the prohibited area from the location indicated by the reported location information, and a second distance, which is a distance in a second direction to the prohibited area from the location indicated by the reported location information.

By a composition of this kind, it is possible to reduce the amount of data transmitted from the database apparatus to the mobile communication apparatus. Furthermore, since the distance to the prohibited area relating to the direction of movement of the mobile communication apparatus is determined by an interpolation process, then the effects due to reduction in the amount of data are suppressed and highly accurate calculation of the available distance becomes possible.

Desirably, the step in which a frequency to be used for communication is determined according to the present invention includes: an available distance calculation step of determining, for each frequency, a distance to the prohibited area in the direction of movement of the mobile communication apparatus, by interpolation on the basis of the first distance and the second distance included in the distance information; and a frequency selection step of determining, as a frequency to be used for communication, a frequency providing the longest distance, of the distances determined by the available distance calculation step.

In this way, by adopting a frequency providing a longest available distance, it is possible to suppress the number of handovers between frequencies (generally, called "vertical handovers"). The criteria for selecting the frequency is not necessarily limited to the available distance only. Desirably, the frequency to use is determined by taking account of the available distance and other factors. For example, desirably, the frequency to use is determined with reference to the amount of data that can be communicated in the time until the frequency becomes unavailable. In this case, the frequency to use is determined by taking account of the available distance and the communication rate.

The following three processing methods can be envisaged, for example, for the interpolation processing described above.

The first interpolation processing method is a method called triangular interpolation in the present Description. In triangular interpolation, the distance to the prohibited area in the direction of movement of the mobile communication apparatus is determined by assuming that a boundary of the prohibited area is a straight line linking a point distanced by the first distance in the first direction from a current location of the mobile communication apparatus, and a point distanced by the second distance in the second direction from the current location of the mobile communication apparatus.

The second interpolation processing method is a method called elliptical interpolation in the present Description. In elliptical interpolation, the distance to the prohibited area in the direction of movement of the mobile communication apparatus is determined by assuming that a boundary of the prohibited area is an ellipse passing through a point distanced by the first distance in the first direction from a current location of the mobile communication apparatus, and a point distanced by the second distance in the second direction from the current location of the mobile communication apparatus.

The third interpolation processing method is a method called rectangular interpolation in the present Description. In rectangular interpolation, the distance to the prohibited area in the direction of movement of the mobile communication apparatus is determined by assuming that a boundary of the prohibited area is a rectangle passing through a point distanced by the first distance in the first direction from a current location of the mobile communication apparatus, and a point distanced by the second distance in the second direction from the current location of the mobile communication apparatus.

Furthermore, in the present invention, desirably, the distance information generated by the database apparatus includes information indicating whether the prohibited area in the first direction and the prohibited area in the second direction are the same area or different areas. In this case, in the mobile communication apparatus, desirably, elliptical interpolation is adopted if the prohibited areas in the first direction and the second direction are the same area, and rectangular interpolation is adopted if the prohibited areas are different areas.

Since the shape of the boundary line of the prohibited areas differs, depending on whether the prohibited areas in the first direction and the second direction are the same or different, then the suitable interpolation method also varies. By selectively using elliptical interpolation and rectangular interpolation according to circumstances in this way, it is possible to calculate the distance to the prohibited area in the direction of movement more appropriately.

Furthermore, desirably, the present invention further includes: a step in which the mobile communication apparatus reports a direction of movement of the mobile communication apparatus, to the database apparatus, and two directions nearest to the direction of movement of the mobile communication apparatus are selected as the first direction and the second direction from among predetermined directions.

The information required by the mobile communication apparatus in the process for determining the frequency to use is the distance to the prohibited area in the two directions nearest to the direction of movement. Therefore, the direction of movement is reported from the mobile communication apparatus to the database apparatus, and the database apparatus reports only the distance information in the two directions nearest to this direction of movement, to the mobile communication apparatus. In so doing, it is possible to reduce the amount of data communications between the database apparatus and the mobile communication apparatus.

In the present invention, the first direction and the second direction may be perpendicular directions. For example, the first direction and the second direction may be selected from among four predetermined directions 90° apart from each other. Furthermore, these four direction can be set as the north, south, east and west directions.

However, in the present invention, the first direction and the second direction do not necessarily have to be perpendicular directions. For example, the first direction and the second direction may be selected from among eight predetermined directions 45° apart from each other. In general, the first direction and the second direction can be selected from among N predetermined directions at 360/N degrees apart (where N is an integer). Furthermore, these N directions do not necessarily have to be obtained by dividing up 360 degrees into equal portions.

Moreover, in the present invention, desirably, the mobile communication apparatus determines the frequency to be used for communication by also taking account of a predicted path of travel of the mobile communication apparatus.

More specifically, desirably, the frequency to use is determined by: a step of acquiring a predicted path of movement of the mobile communication apparatus; a step of setting an intermediate point on the predicted path of movement; a step of acquiring distance information at the intermediate point, from the database apparatus; a step of determining, for each frequency, a distance to a prohibited area in the direction of movement from the current location on the basis of the distance information at the current location, and if the distance exceeds a distance to a next intermediate point on the predicted path of movement, determining a distance to the prohibited area in the direction of movement from the next intermediate point on the basis of the distance information at the next intermediate point and the direction of movement at the next intermediate point, and calculating the sum of the distance from the current location of the mobile communication apparatus to the next intermediate point and the distance to the prohibited area determined at the next intermediate point, as the available distance for the frequency; and a frequency selection step of determining, as a frequency to be used for communication, a frequency providing the longest distance, of the distances determined by the available distance calculation step.

In the processing described above, if the available distance at the next intermediate point exceeds the distance until the next intermediate point after that, then the available distance may be calculated with reference to the next intermediate point, according to requirements. This can be repeated as many times as necessary.

According to a composition of this kind, it is possible to calculate the available distance for each frequency by taking account of the predicted path of travel of the mobile communication apparatus, and therefore a more accurate frequency can be selected.

The present invention can also be comprehended as a frequency determination method including at least a portion of the above-mentioned processing. Furthermore, the present invention can also be comprehended as a computer program for executing this method. Moreover, the present invention can be comprehended as a wireless communications system, a mobile communication apparatus or a database apparatus having means for executing at least a portion of the above-mentioned processing. The present invention can also be formed by respectively combining the various means and processes described above, as and where possible.

For example, the wireless communications system which is one aspect of the present invention is a wireless communications system formed by a database apparatus and a mobile communication apparatus, the mobile communication apparatus performing communications by selecting a frequency from among available frequencies; wherein the database apparatus includes: prohibited area storage means for storing, for each frequency, a prohibited area which is an area where a licensed user is using radio waves; and distance information generating means for determining, for each frequency and on the basis of location information reported from the mobile communication apparatus, a first distance, which is a distance in a first direction to the prohibited area from a location indicated by the reported location information, and a second distance, which is a distance in a second direction to the prohibited area from the location indicated by the reported location information, and generating distance information including the first distance and the second distance, and the mobile communication apparatus includes: location information acquisition means for acquiring location information; distance information requesting means for reporting the location information to the database apparatus and acquiring the distance information; and use frequency determining means for determining a frequency to be used for communication, on the basis of the reported distance information and a direction of movement of the mobile communication apparatus.

Moreover, the mobile communication apparatus in one aspect of the present invention is a mobile communication apparatus which performs communication by determining a frequency to use on the basis of distance information reported from a database apparatus storing, for each frequency, a prohibited area which is an area where a licensed user is using radio waves, the mobile communication apparatus including: location information acquisition means for acquiring location information; distance information requesting means for reporting the location information to the database apparatus and acquiring distance information including a first distance, which is a distance in a first direction to the prohibited area from a location indicated by the location information, and a second distance, which is a distance in a second direction to the prohibited area from the location indicated by the location information; and use frequency determining means for determining a frequency to be used for communication, on the basis of the reported distance information and a direction of movement of the mobile communication apparatus.

Moreover, the database apparatus in one aspect of the present invention includes: prohibited area storage means for storing, for each frequency, a prohibited area which is an area where a licensed user is using radio waves; and distance information generating means for determining, for each frequency and on the basis of location information reported from a mobile communication apparatus, a first distance, which is a distance in a first direction to the prohibited area from a location indicated by the reported location information, and a second distance, which is a distance in a second direction to the prohibited area from the location indicated by the reported location information, and generating distance information including the first distance and the second distance.

Advantageous Effects of Invention

According to the present invention, it is possible to provide white space information efficiently to a mobile terminal from a database apparatus having white space information, as well as appropriately determining a frequency to be used by the mobile terminal for communication, on the basis of the provided white space information.

BRIEF DESCRIPTION OF THE DRAWINGS

FIG. 6A to FIG. 6C are diagrams illustrating a method for calculating the distance to an interference area in the direction of movement of a vehicle; wherein FIG. 6A shows a method based on triangular interpolation, FIG. 6B shows a method based on elliptical interpolation, and FIG. 6C shows a method based on rectangular interpolation;

DESCRIPTION OF EMBODIMENTS

First Embodiment

System Overview

Figure 1:
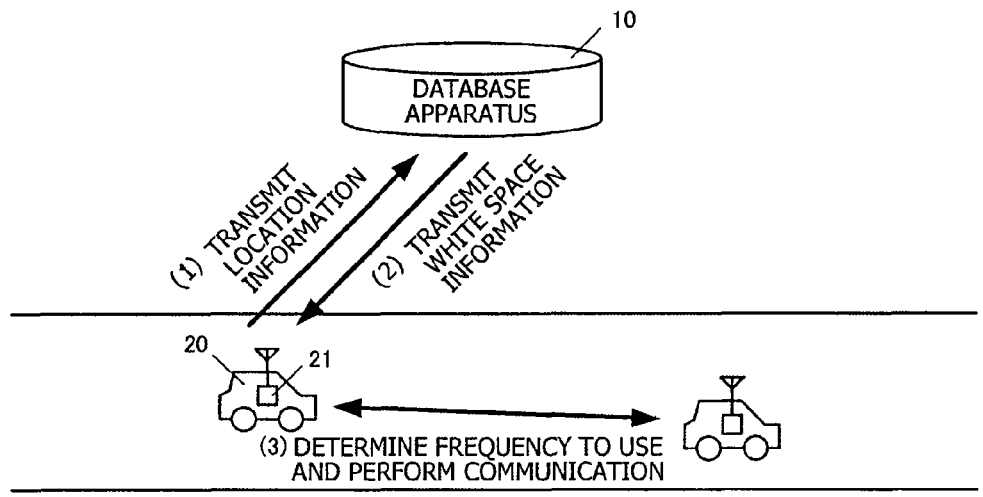
FIG. 1 is a diagram showing an overview of a wireless communications system relating to an embodiment of the invention.

The first embodiment of the present invention is a wireless communications system which is constituted by a vehicle provided with a vehicle-mounted communication apparatus (vehicle-mounted terminal), and a database apparatus. FIG. 1 is a schematic drawing of a wireless communications system relating to the present embodiment. In broad terms, the wireless communications system is constituted by a database apparatus 10 and a vehicle 20 provided with a vehicle-mounted terminal 21.

The vehicle-mounted terminal 21 performs communication with another vehicle-mounted terminal by using a white space. A white space is a frequency which is not being used by a primary user (licensed user), and which is available to a secondary user. The vehicle-mounted terminal 21 uses a white space as a secondary user, provided that it does not interfere with primary users. The vehicle-mounted terminal 21 uses white space information obtained from the database apparatus 10 to determine the frequencies available at the current location.

The database apparatus 10 holds information (white space information), respectively for various frequencies, that permits identification of an area where that frequency is available for use and an area where the frequency is not available for use at the current time. The following description of the present invention is premised on the fact that the database apparatus 10 holds white space information, irrespective of how the database apparatus 10 creates this white space information. As a method for creating white space information, if, for example, the primary users are broadcasters having fixed radio masts, then the mast locations, the transmitted power intensity (the reach of the radio waves), and the broadcast timings might be gathered, and white space information might be created on the basis of the information. Apart from this, it might also be possible to create white space information by gathering the availability status of frequencies at each location, in real time, storing same in the database apparatus 10, and applying statistical processing to the gathered information.

Figure 2:
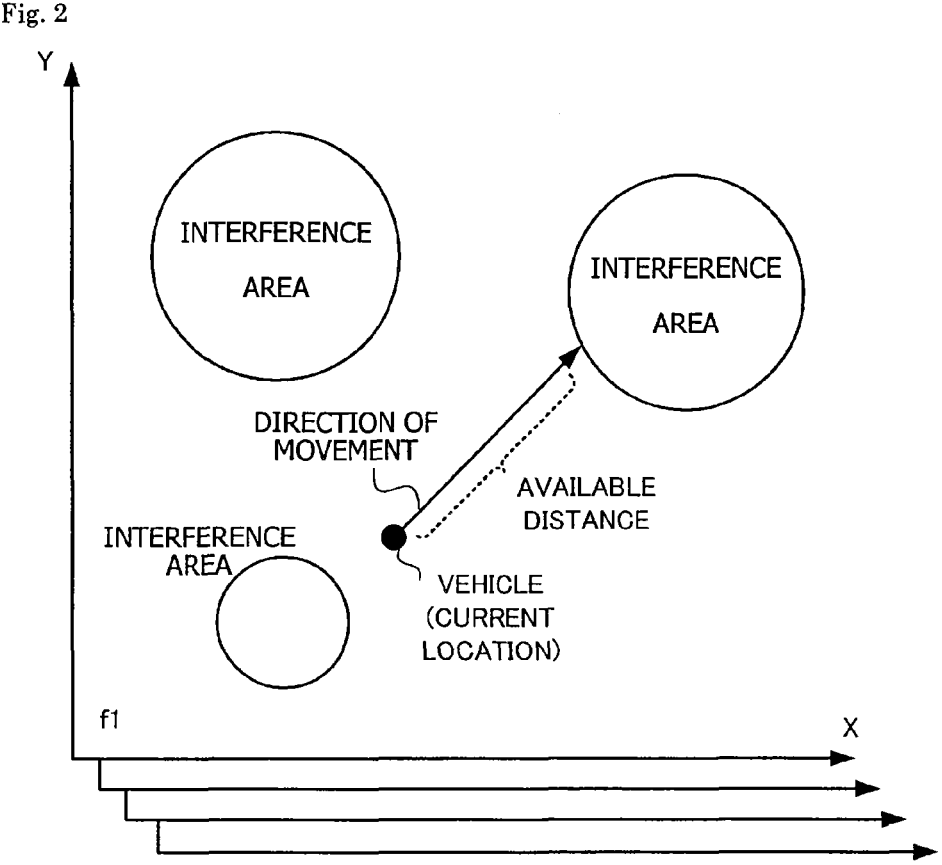
FIG. 2 is a diagram illustrating an overview of a frequency determination method.

By using information relating to the white spaces, as shown in FIG. 2, it is possible to calculate the distance that the frequency is available to the vehicle 20, by taking account of the current location and direction of movement of the vehicle 20. The definition of a desirable frequency for the vehicle 20 varies with the requirements of the application, and so on, but here the frequency having the longest available distance (or time) is considered to be desirable.

Furthermore, in the present embodiment, the frequency selection processing is carried out in the vehicle 20 in order to avoid concentration of processing load in the database apparatus 10. Consequently, the database apparatus 10 basically carries out only a process for reporting information relating to white spaces, to the vehicle 20.

<Method for Reporting White Space Information>

Figure 3:
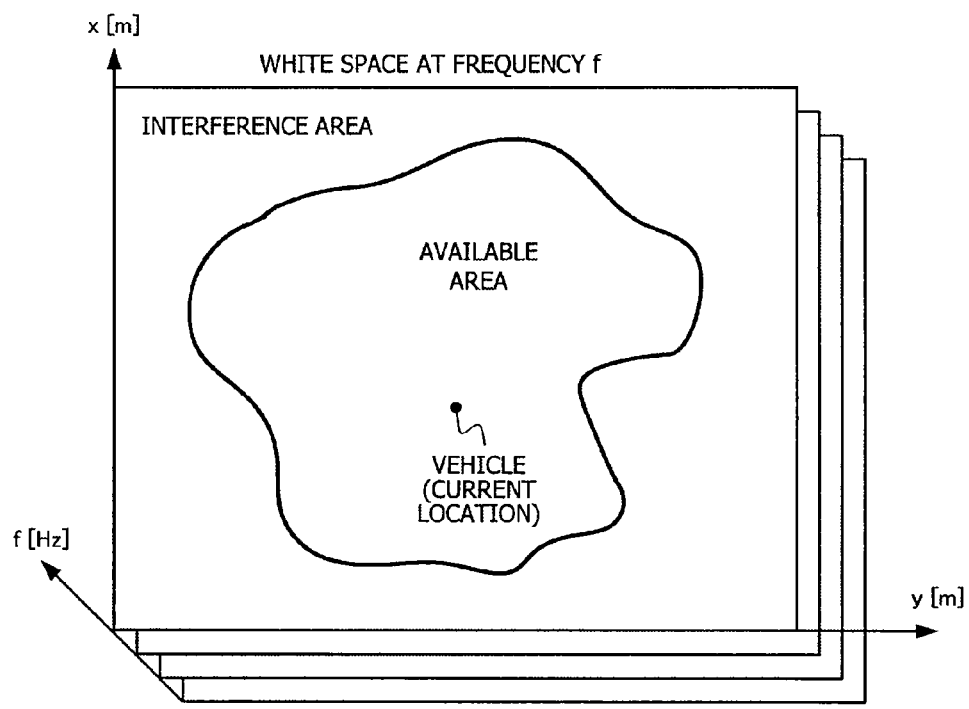
FIG. 3 is a diagram illustrating a white space.

The problem here is how to transmit information relating to the white spaces, from the database apparatus 10 to the vehicle 20. As shown in FIG. 3, it can be seen that the distance from the current location of the vehicle 20 to the interference area in each direction is reported to the vehicle 20, and the availability of the frequencies can be calculated accurately. However, transmitting information relating to all directions is not possible in practical terms, in view of the amount of communications data, and reduction of the data amount is required.

Figure 4:
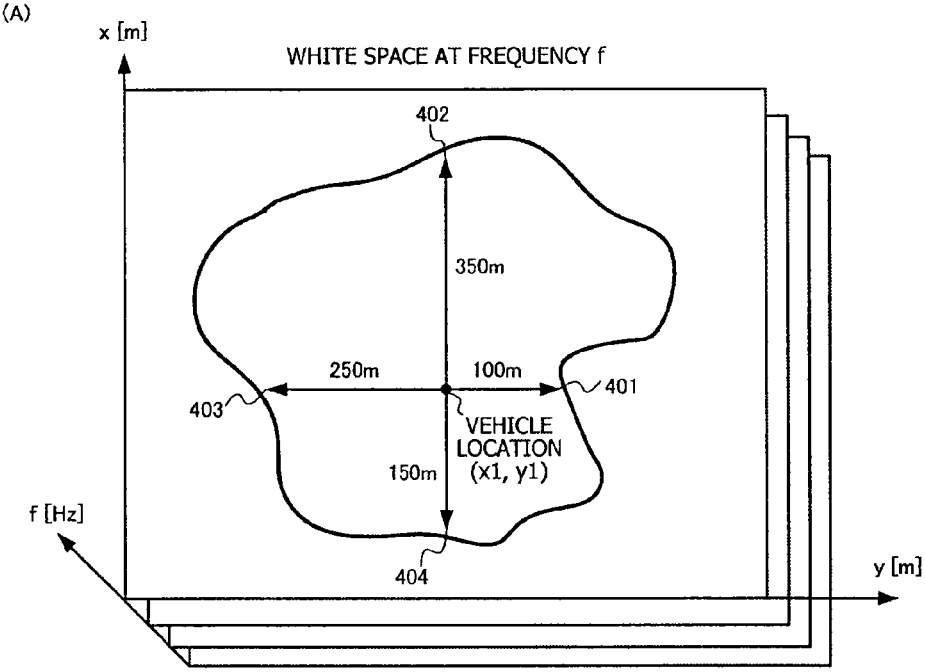
FIG. 4A and FIG. 4B are diagrams illustrating the representation of a white space by white space vectors.
Figure 4:
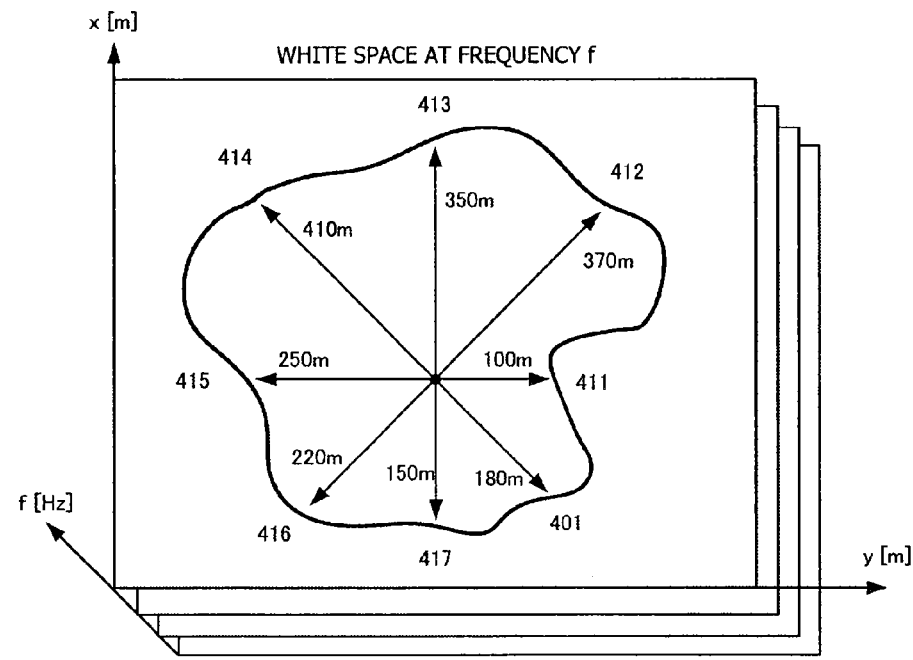

In the present embodiment, as shown in FIG. 4A or 4B, the database apparatus 10 reports to the vehicle 20 the distance to an interference area in each of the predetermined directions, centered on the current location of the vehicle 20.

In FIG. 4A, the distance to an interference area is reported to the vehicle 20 in respect of four directions 401 to 404 which are 90 degrees apart from each other (for example, direction 401 is the east direction, direction 402, the north direction, direction 403, the west direction, and direction 404, the south direction). In the example shown in FIG. 4A, the distances to the interference area in each of the directions 401 to 404 are respectively 100 m, 350 m, 250 m and 150 m, and therefore the data (100, 350, 250, 150) is reported to the vehicle 20 from the database apparatus 10. In the present Description, information which combines the distances to the interference areas in respective directions in this way is called a "white space vector" (which may be abbreviated to "WSV"). The white space vector corresponds to the distance information in the present invention.

In FIG. 4B, the distance to the interference area is reported to the vehicle 20 in respect of eight directions 411 to 418 which are 45° apart from each other. In the example in FIG. 4B, the WSV (100, 370, 350, 410, 250, 220, 150, 180) is reported to the vehicle 20.

With regard to the resolution of the directions, the finer the resolution, the more accurately the shape of the white space can be reported to the vehicle 20, but the amount of communications data increases accordingly, and a problem also arises in that the amount of calculation performed by the database apparatus 10 also increases. In the present invention, there is no upper limit on the resolution of the directions. However, sufficient beneficial effects are obtained with approximately 8 directions (in units of 45° apart), as shown in FIG. 4B.

Figure 5:
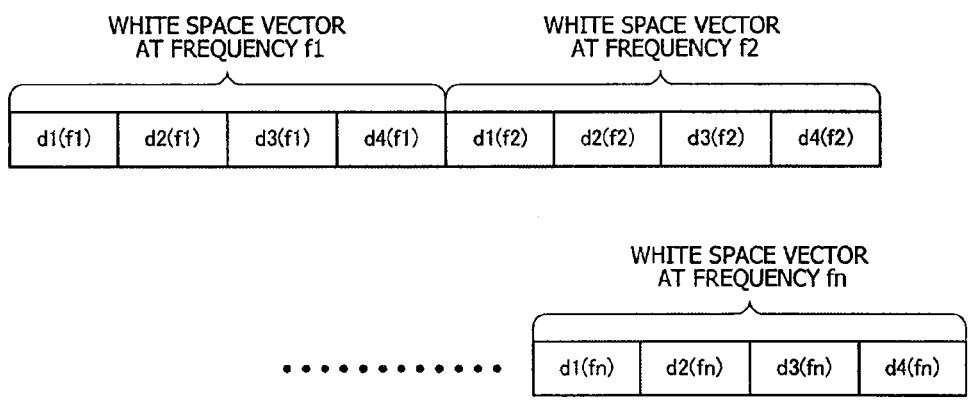
FIG. 5 is a diagram showing a data structure of white space information according to a first embodiment.

One WSV is determined for each frequency. The database apparatus 10 calculates the WSVs for a plurality of frequencies and transmits the WSVs to the vehicle 20. FIG. 5 shows the data structure of white space information transmitted from the database apparatus 10 to the vehicle 20. FIG. 5 relates to an example in which WSVs comprising four components are employed, as shown in FIG. 4A. The white space information is constituted by numerical values to the interference areas in each of the above-mentioned four directions, for each frequency from f1 to fn. This numerical value can be quantized in units of a suitable distance (for example, 10 meters), thereby reducing the amount of data in the white space information.

<Method of Determining Frequency>

The vehicle 20 which has acquired the white space information from the database apparatus 10 determines an optimal frequency for communication, on the basis of this information. This frequency determination processing involves the following two steps.

1. Calculate the available distance for each frequency.
2. Select the frequency providing the greatest available distance.

Here, step 1, in other words, the process of calculating the available distance for a particular frequency from the white space vector (WSV) for that frequency, will be described. Here, it is assumed that the direction of movement of the vehicle is uniform and does not change during the process. A method of calculation which takes account of the movement path of the vehicle is described in a further embodiment.

The WSV only provides the distances to the interference areas in particular directions, and therefore the directions of the respective components of the WSV do not generally coincide with the direction of movement of the vehicle 20. Consequently, it is necessary to use interpolation to infer the distance to the interference area in the direction of movement of the vehicle 20. There are three main interpolation methods that can be envisaged. Examples of these three interpolation processes are shown FIG. 6A to FIG. 6C.

Figure 6:
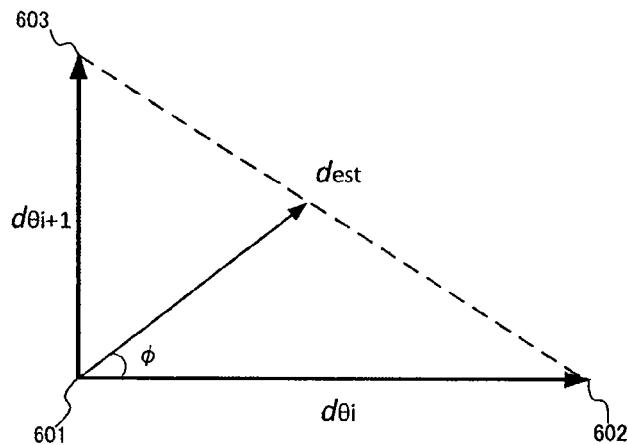
Figure 6:
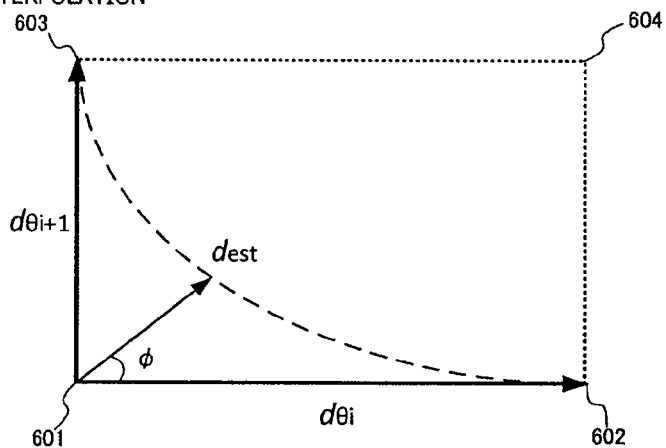
Figure 6:
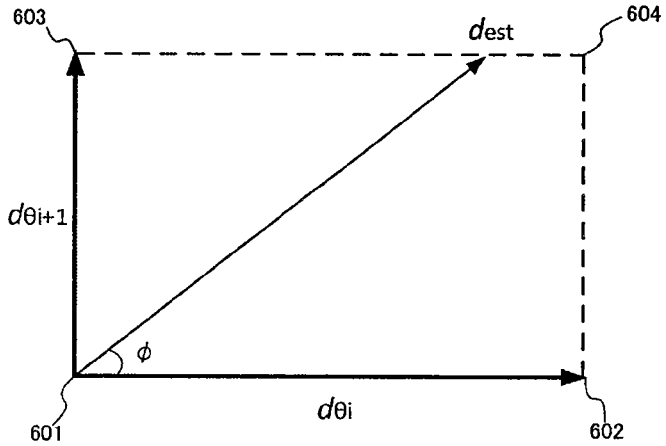

The first method is a method for determining the available distance by assuming that the boundary of the interference area is a straight line. In the present Description, this first method is called "triangular interpolation". FIG. 6A is a diagram illustrating triangular interpolation. In FIG. 6A, point 601 indicates the location of the vehicle, and the angle $\phi$ indicates the direction of movement of the vehicle. $\theta_i$ and $\theta_{i+1}$ are the two directions closest to the direction of movement of the vehicle, of the WSV components, and $d_{\theta i}$ and $d_{\theta+i}$ are the distances to the interference areas in the direction $\theta_i$ and the direction $\theta_{i+1}$. Therefore, it can be seen that the point 602 distanced by $d_{\theta i}$ in the $\theta_i$ direction from the current location 601 of the vehicle and the point 603 distanced by d $\theta_{i+1}$ in the $\theta_{1+1}$ direction from the current location 601 of the vehicle are at the boundary between the interference area and the non-interference area. However, apart from point 602 and point 603, the boundary between the interference area and the non-interference area is not clear. Therefore, in the method illustrated in FIG. 6A, the distance to the interference area in the direction of travel of the vehicle is found by assuming that the boundary of the interference area is a straight line linking point 602 and point 603.

Based on the assumption described above, the distance $d_{est}$ to the interference area in the direction of travel $\phi$ of the vehicle is represented by the following expression.

$$d_{est} = \frac{d_{\theta i} d_{\theta i+1} \sin\phi}{d_{\theta i}\sin\phi + d_{\theta i+1}\sin\left(\frac{2\pi}{N} - \phi\right)} \quad \text{[Expression 1]}$$

The second method is a method for determining the available distance by assuming that the boundary of the interference area is an elliptical line. In the present Description, this second method is called "elliptical interpolation". FIG. 6B is a diagram illustrating elliptical interpolation. Of the elements in FIG. 6B, those which are the same as FIG. 6A are labelled with the same reference numerals and description thereof is omitted here. Point 604 in FIG. 6B is a point which forms a rectangle with the points 601, 602 and 603. In the method shown in FIG. 6B, it is assumed that the boundary between the interference area and the non-interference area is an elliptical shape centered on point 604 and having the segment 602 to 604 and the segment 603 to 604 as respective radii.

Based on the assumption described above, the distance $d_{est}$ to the interference area in the direction of travel $\phi$ of the vehicle is represented by the following expression.

$$d_{est} = \sqrt{x_{est}^2 + y_{est}^2} \quad \text{[Expression 2]}$$

where, $$x_{est} = \frac{d_{\theta i} d_{\theta i+1} \left( d_{\theta i+1} + d_{\theta i}\tan\phi \pm \sqrt{2 d_{\theta i} d_{\theta i+1} \tan\phi} \right)}{d_{\theta i}^2 \tan^2\phi + d_{\theta i+1}^2}$$

$$y_{est} = x_{est}\tan\phi$$

The third method is a method for determining the available distance by assuming that the boundary of the interference area is a rectangular shape. In the present Description, this third method is called "rectangular interpolation". FIG. 6C is a diagram illustrating rectangular interpolation. Of the elements in FIG. 6C, those which are the same as FIG. 6A and FIG. 6B are labelled with the same reference numerals and description thereof is omitted here. In the method shown in FIG. 6C, it is assumed that the boundary between the interference area and the non-interference area is formed by a segment having ends at point 602 and point 604, and a segment having ends a point 603 and point 604.

Based on the assumption described above, the distance $d_{est}$ to the interference area in the direction of travel $\phi$ of the vehicle is represented by the following expression.

$$d_{est} = \begin{cases} \dfrac{d_{\theta i}}{\cos\phi} & \text{if } 0 \le \phi \le \tan^{-1}\dfrac{d_{\theta i+1}}{d_{\theta i}} \\ \dfrac{d_{\theta i+1}}{\sin\phi} & \text{otherwise} \end{cases} \quad \text{[Expression 3]}$$

If these three interpolation methods are compared, the elliptical interpolation (FIG. 6B) provides the shortest distance, the rectangular interpolation (FIG. 6C) provides the longest distance, and the triangular interpolation (FIG. 6A) provides an intermediate distance. If there is no information on the shape of the white space, then it is possible to infer that the triangular interpolation which provides an intermediate evaluation will provide the most appropriate estimation result. Therefore, in the description of the present embodiment given below, it is supposed that triangular interpolation is used to determine the available distance.

However, it is also possible to employ elliptical interpolation or rectangular interpolation, instead of triangular interpolation, and it is also possible to employ averaging of the results of two or three of these three methods. Furthermore, if information on the shape of the white space is obtained, then it is desirable to change the interpolation method employed on the basis of this information. This method is described in a further embodiment.

The available distance in the direction of movement of the vehicle is determined by estimation such as that described above. This calculation of the available distance is carried out for all frequencies. Therefore, the frequency providing the longest available distance, of the available distances determined for each frequency, is regarded as the most desirable frequency, and this frequency is set as the frequency to be used (process 2 above).

<System Details>
[Functional Composition]

Figure 7:
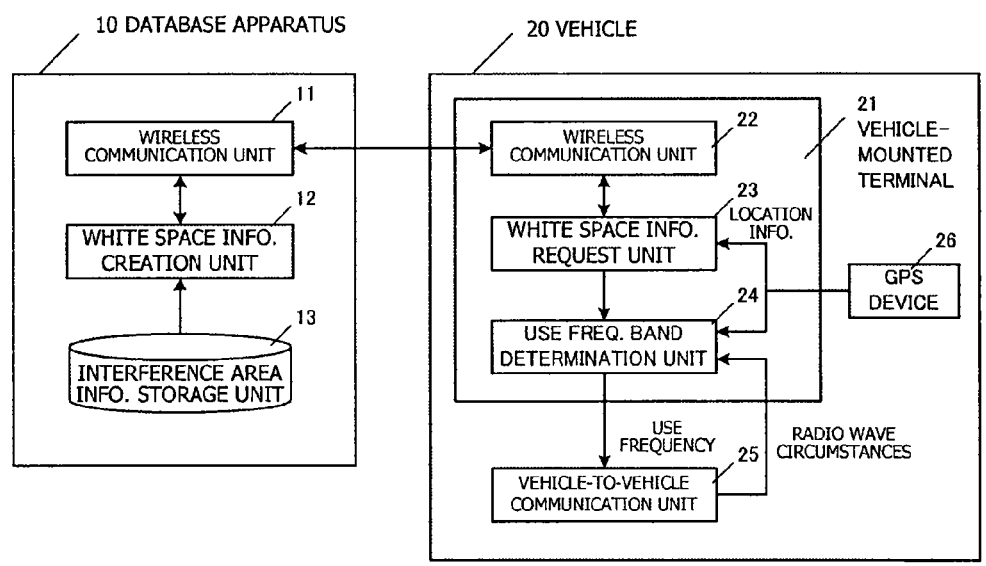
FIG. 7 is a diagram showing the functional block of a wireless communications system relating to an embodiment of the invention.

FIG. 7 shows a functional block diagram of a database apparatus 10 and a vehicle 20 which constitute the wireless communications system according to the present embodiment. The database apparatus 10 is a computer (electronic calculating device) including a CPU, a RAM and an auxiliary storage device, such as an HDD, and operates as the following functional sections by the CPU reading in and executing a computer program, such as an operating system, application program, or the like. More specifically, the database apparatus 10 functions as a wireless communication unit 11, a white space information creation unit 12, and an interference area information storage unit 13.

The wireless communication unit 11 is an interface for communicating with the vehicle-mounted terminal 21 of the vehicle 20. Any wireless communications method can be used, provided that it enables communication with the vehicle-mounted terminal 21, for example, it is possible to employ LTE (Long Term Evolution), Mobile WiMax (IEEE 802.16e), WAVE (IEEE 802.16p), iBurst (IEEE 802.20), and the like.

The white space information creation unit 12 acquires location information for the vehicle, and furthermore, refers to the interference area information storage unit 13 to create information indicating the distances to the interference areas peripheral to the location of the vehicle. These distances are calculated only in respect of the prescribed number of directions (for example, four directions). A combination of these distance values is the white space vector described above.

The frequency use areas of primary users at respective timings at any geographical point are stored for a plurality of frequencies in the interference area information storage unit 13. Stated alternatively, the interference area information storage unit 13 stores, for a plurality of frequencies, the areas which cannot be employed by secondary users (which would create interference with primary users if employed) at respective timings at any geographic point. Any method can be employed for creating the interference area information storage unit 13 in the present embodiment. The interference areas may be acquired from the information such as the locations of radio masts, the transmission output and the transmission time bands, and the like, or the interference areas may be acquired by measurement in real time, or the interference areas may be acquired by statistical processing of measurements over a fixed time period. Furthermore, in the present embodiment, any method may be used as the specific method of holding the data of the interference area information in the database apparatus 10. The data holding method can employ any existing method, such as a distributed relational database, or the like.

The database apparatus 10 does not have to be constituted by only one computer, and may also be constituted by a distributed system constituted by a plurality of computers which are interconnected via a network.

The vehicle 20 is provided with a vehicle-mounted terminal 21, a vehicle-to-vehicle communication apparatus 25 and a GPS device 26. The vehicle-mounted terminal is a computer including a CPU, a RAM and a ROM, and performs the following functions by the CPU reading in and executing a computer program, such as an operating system, application program, or the like. More specifically, the vehicle-mounted terminal operates as a wireless communication unit 22, a white space information request unit 23 and a use frequency band determination unit 24.

The wireless communication unit 22 is an interface for communicating with the database apparatus 10. Any wireless communications method can be used, provided that it enables communication with the database apparatus 10, for example, it is possible to employ LTE (Long Term Evolution), Mobile WiMax (IEEE 802.16e), WAVE (IEEE 802.16p), iBurst (IEEE 802.20), and the like.

The white space information request unit 23 acquires location information obtained from the GPS device 26 and creates a white space information request including this location information. The created white space information request is transmitted to the database apparatus 10 via the wireless communication unit 22. The transmission timing of the white space information request is the timing at which a requirement to determine the frequency to be used for communication occurs, for instance, when starting communication or when the frequency used thus far becomes unavailable, or the like.

The use frequency band determination unit 24 determines the frequency to be used, on the basis of the white space information obtained from the database apparatus 10 as a result of the white space information request, and the current location obtained from the GPS device 26. Since the method of determining the use frequency has been described above, the explanation will not be repeated here.

The vehicle-to-vehicle communication apparatus 25 is an apparatus which performs wireless communications with another vehicle. Any wireless communication method may be employed, but desirably, the method is adaptable to a broad frequency band, so as to be able to use a larger number of white spaces. Furthermore, the vehicle-to-vehicle communication apparatus 25 has a function for carrying out spectrum sensing, in order to detect the frequencies which can be used at the current time. Desirably, the spectrum sensing can be executed as early as possible, in the broadest possible frequency band. Any existing method can be employed as a spectrum sensing method. For example, it is also possible to determine whether a frequency is in use or not in use, by energy detection, wavelet decomposition, pilot-based spectrum sensing, spectrum sensing based on unique values, feature detection, a matched filter method, or the like, according to the detected wireless communication method.

[Details of Processing]

Figure 8:
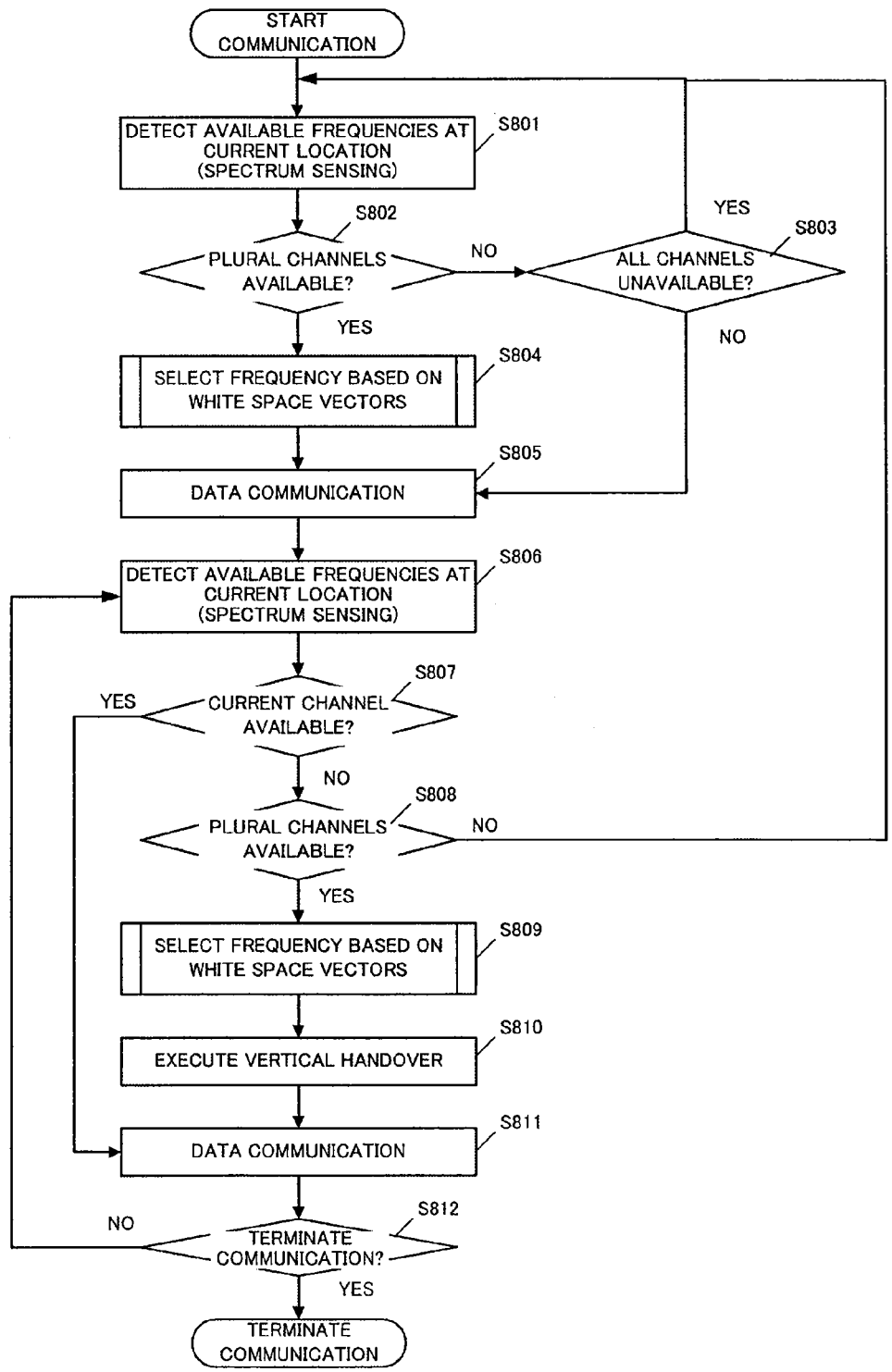
FIG. 8 is a flowchart showing an overall flow of wireless communication processing performed by a vehicle-mounted terminal in first to fourth embodiments.

FIG. 8 is a flowchart showing the processing of a vehicle-to-vehicle communication method in a vehicle 20 according to the present embodiment. When the vehicle 20 starts communication, firstly, the vehicle-to-vehicle communication apparatus 25 detects the available frequencies at the current location (S801). Here, if an available frequency is not detected (S802—NO and S803—YES), then detection of available frequencies is carried out again after a period of time. On the other hand, if only one available frequency is detected (S802—NO and S803—NO), then a data communication is started by using this frequency.

If a plurality of available frequencies are detected (S802—YES), then the procedure advances to step S804. In step S804, the vehicle-mounted terminal 21 requests white space information from the database apparatus 10, and determines the frequency to be used on the basis of the obtained white space information. The vehicle-to-vehicle communication apparatus 25 carries out data communication using the determined frequency. The details of the frequency selection process in step S804 are described hereinafter with reference to FIG. 9A and FIG. 9B.

The peripheral spectrum sensing is continued by the vehicle-to-vehicle communication apparatus 25 during data communication (S806). If the currently used frequency is available (S807—YES), then the data communication is continued without alteration (S811). On the other hand, if the currently used frequency is unavailable, or is predicted to become unavailable (S807—NO), then a frequency change process is carried out. If a plurality of available frequencies are detected (S808—YES), then the vehicle-mounted terminal 21 executes a frequency selection process based on the white space information (S809), and implements a handover for switching frequency (vertical handover) (S810). The processing in step S809 is the same as the processing in step S804.

When the vertical handover is completed, the data communication is restarted (S811). During data communication, spectrum sensing (S806) is continued, and the vertical handover is repeated, as and when necessary, until the data communication is terminated (until S812—YES).

Figure 9A:
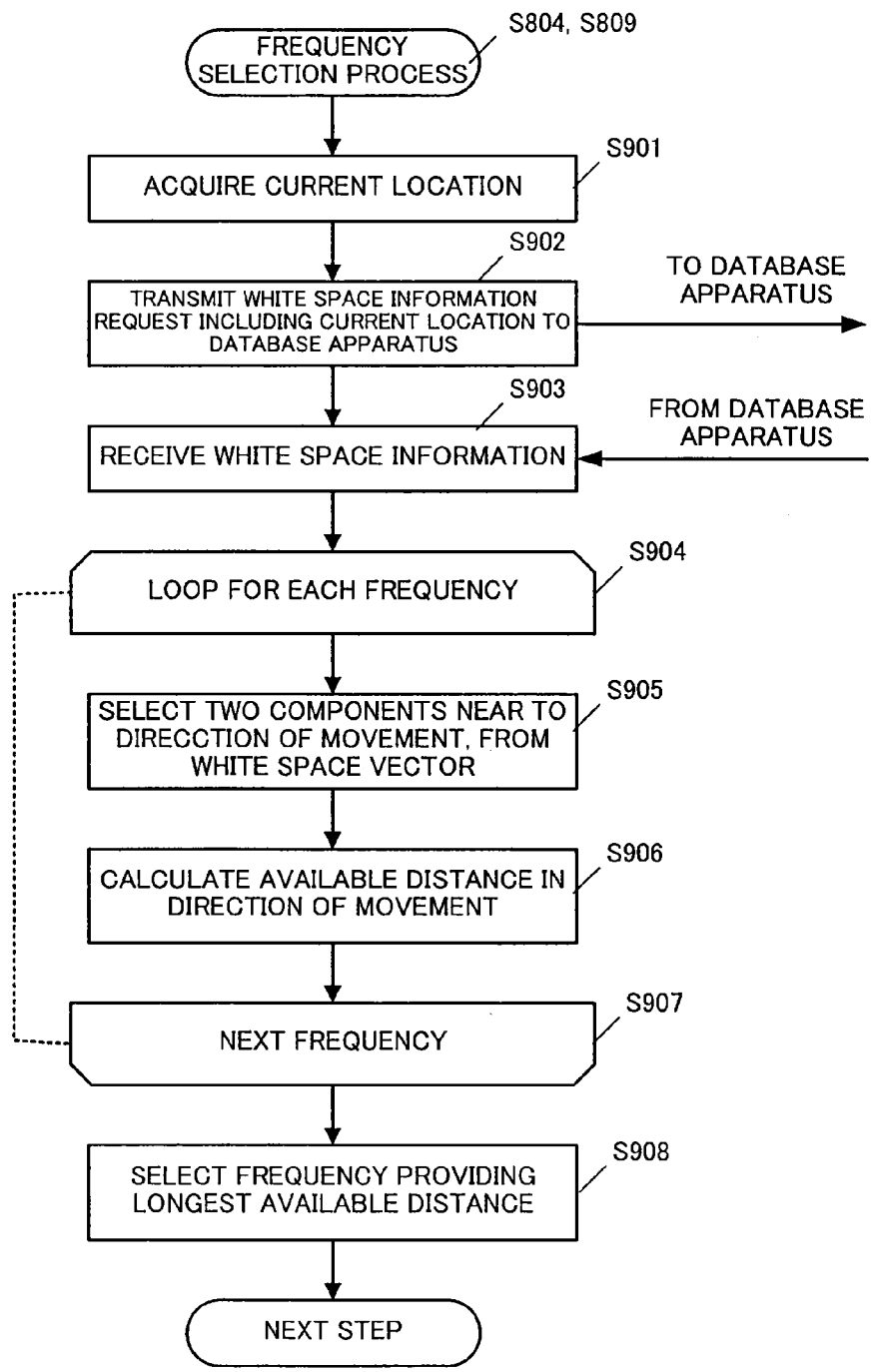
FIG. 9A is a flowchart showing details of a frequency selection process in the vehicle-mounted terminal according to the first embodiment.
Figure 9B:
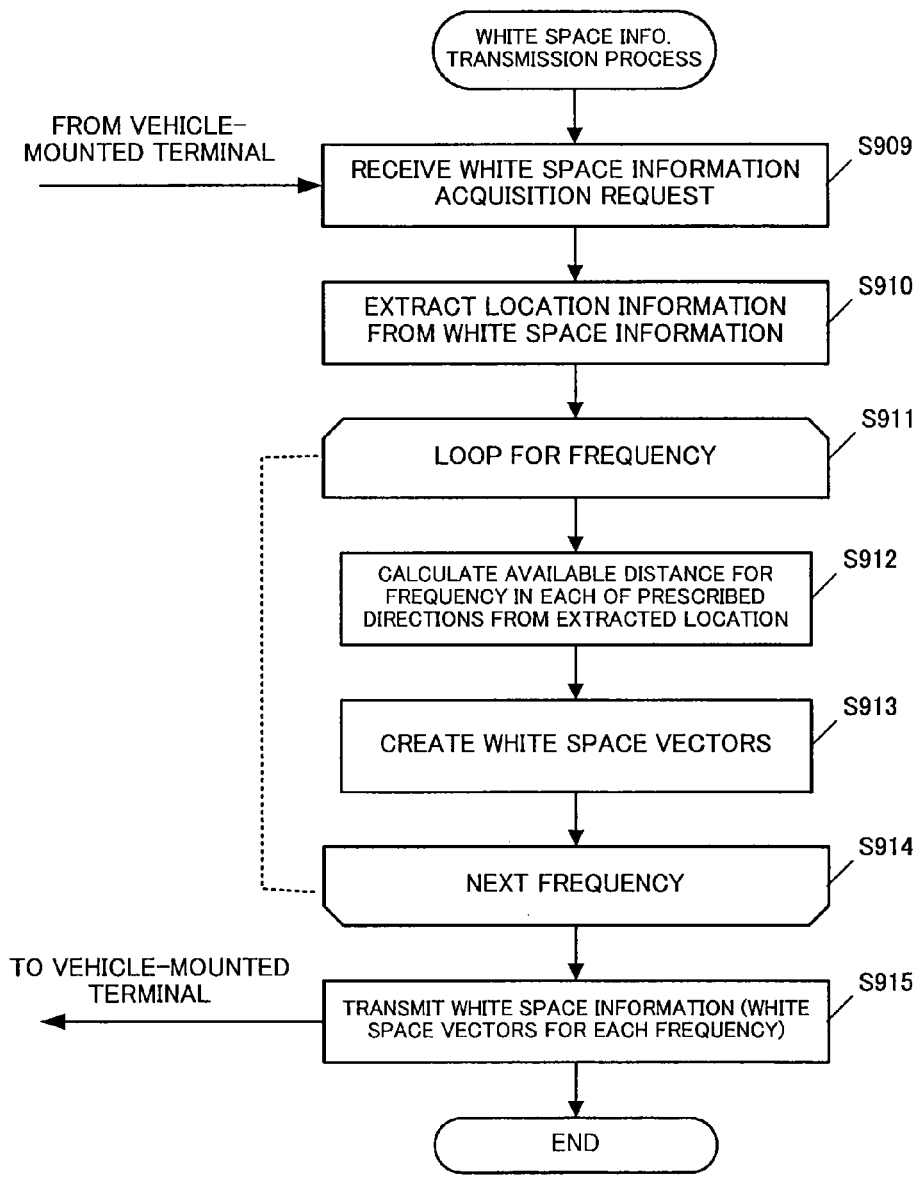
FIG. 9B is a flowchart showing a white space information generating process in a database apparatus according to the first embodiment.

Next, the details of the frequency selection process in step S804 and step S809 will be described with reference to FIG. 9A and FIG. 9B. FIG. 9A is a flowchart of processing carried out in the vehicle-mounted terminal 21, and FIG. 9B is a flowchart of processing carried out in the database apparatus 10.

Firstly, FIG. 9A will be described. When the frequency selection process is started, the vehicle-mounted terminal 21 acquires the current location from the GPS device 26. The white space information request unit 23 generates a white space information request including the current location and transmits this request to the database apparatus 10 via the wireless communication unit 22 (S902).

Here, the processing in database apparatus 10 is described with reference to FIG. 9B. Upon the database apparatus 10 receiving the white space information request from the vehicle-mounted terminal 21 (S909), the white space information creation unit 12 extracts the current location of the vehicle which is included in the white space information request (S910). Thereupon, the distance in which the frequency is available (the distance to the interference area) from the current location of the vehicle extracted from the white space information request, is calculated in each of the prescribed directions (for example, in four directions as shown in FIG. 4A, or in eight directions as shown in FIG. 4B). From this combination of distances, a white space vector corresponding to one frequency is generated (S913). The white space information creation unit 12 repeatedly carries out the processing from step S912 to step S913 in respect of all of the frequencies stored in the interference area information storage unit 13, and acquires a white space vector for all of the frequencies.

The white space information creation unit 12 creates white space information such as that shown in FIG. 5 from the white space vectors for the respective frequencies, and returns this information to the vehicle-mounted terminal 21 via the wireless communication unit 11 (S915).

Returning to FIG. 9A, the description of the processing in the vehicle-mounted terminal 21 will now be continued. When the vehicle-mounted terminal 21 receives white space information from the database apparatus 10 (S903), the use frequency band determination unit 24 repeatedly carries out steps S905 and S906 for each frequency, to calculate the available distance. More specifically, the use frequency band determination unit 24 selects the components of the two directions nearest to the direction of movement of the vehicle, from the white space vector of the frequency in question (S905). The distance from the current location to the interference area in the direction of movement is calculated by using one of the interpolation methods shown in FIG. 6A to FIG. 6C (S906). Here, the distance is calculated using the interpolation method shown in FIG. 6A (triangular interpolation), in other words, using Expression 1.

After calculating the available distance for all of the frequencies, the use frequency band determination unit 24 determines the frequency which provides the longest available distance, as the frequency to use in a vehicle-to-vehicle communication (S908). The use frequency band determination unit 24 transfers this frequency to the vehicle-to-vehicle communication apparatus 25, and the vehicle-to-vehicle communication apparatus 25 uses this frequency to carry out a vehicle-to-vehicle communication.

Advantageous Effects of the Present Embodiment

According to the present embodiment, information relating to the white space which is transmitted from the database apparatus 10 to the vehicle 20 is reported in a format known as a white space vector, which reduces the amount of information, and therefore the volume of communications between the database apparatus 10 and the vehicle 20 can be reduced. Although the volume of communications is reduced, since an interpolation process is carried out in the vehicle 20 and the available distance for each frequency can be calculated, then it is possible to suppress decline in accuracy caused by reduction of the amount of information. Consequently, the volume of communications between the database apparatus 10 and the vehicle 20 is suppressed, and a suitable frequency can be selected for the vehicle 20, taking account of the radio wave usage by primary users.

Since the vehicle is moving, then requests for white space information are made frequently to the database apparatus, and therefore it is effective to suppress the volume of communications. Furthermore, in the present embodiment, the database apparatus only carries out the minimum necessary processing. This is considered to be an efficient method for system operation, taking account of the fact that a large number of white space information requests from a plurality of vehicles must be processed by the database apparatus.

Second Embodiment

In the present embodiment, the content of the data that is exchanged between the database apparatus 10 and the vehicle 20 is different to that in the first embodiment. In the first embodiment, the white space vectors each have a plurality of components, for instance, four or eight components, as shown in FIG. 4A or FIG. 4B. However, as shown in FIG. 6A to FIG. 6C, when calculating the available distance for a frequency, only the two components nearest to the direction of movement of the vehicle are used. Therefore, in the present embodiment, as shown in FIG. 10A and FIG. 10B, the database apparatus 10 reports only the two components nearest to the direction of movement of the vehicle, to the vehicle 20.

Figure 10:
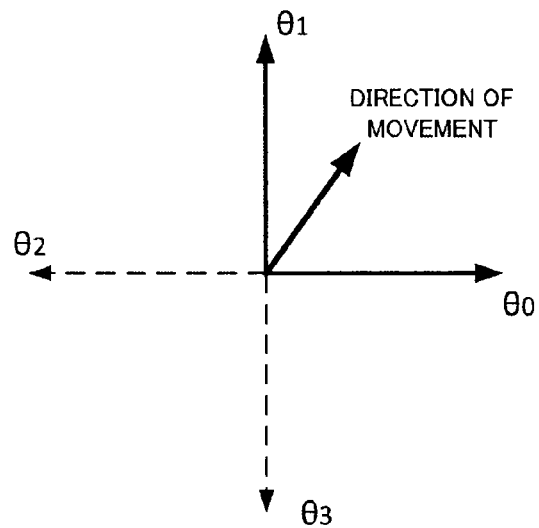
FIG. 10A and FIG. 10B are diagrams illustrating a process of selecting components of a white space vector according to the second embodiment.
Figure 10:
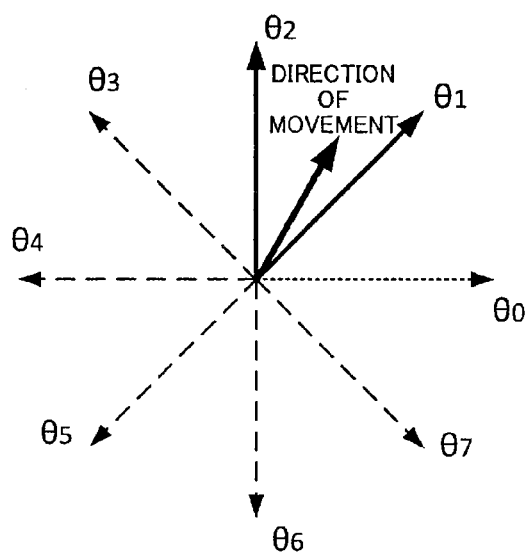

For example, as shown in FIG. 10A, the directions of the white space vector components are assumed to be four directions which are each 90° apart. Here, $\theta_0$ is the east direction (0°), $\theta_1$ is the north direction (90°), $\theta_2$ is the west direction (180°) and $\theta_3$ is the south direction (270°). If the direction of movement of the vehicle is a 60° direction, then the two directions nearest to the direction of movement of the vehicle are $\theta_0$ (0°) and $\theta_1$ (90°). Therefore, only the distances in the $\theta_0$ direction and the $\theta_1$ direction are reported to the vehicle 20, and the distances in the other directions are not reported to the vehicle 20.

As shown in FIG. 10B, if eight directions ($\theta_0$ to $\theta_7$) that are each 45° apart are used, then when the direction of movement of the vehicle is 60°, the directions $\theta_1$ (45°) and $\theta_2$ (90°) which are nearest to the direction of movement are employed.

Figure 11:
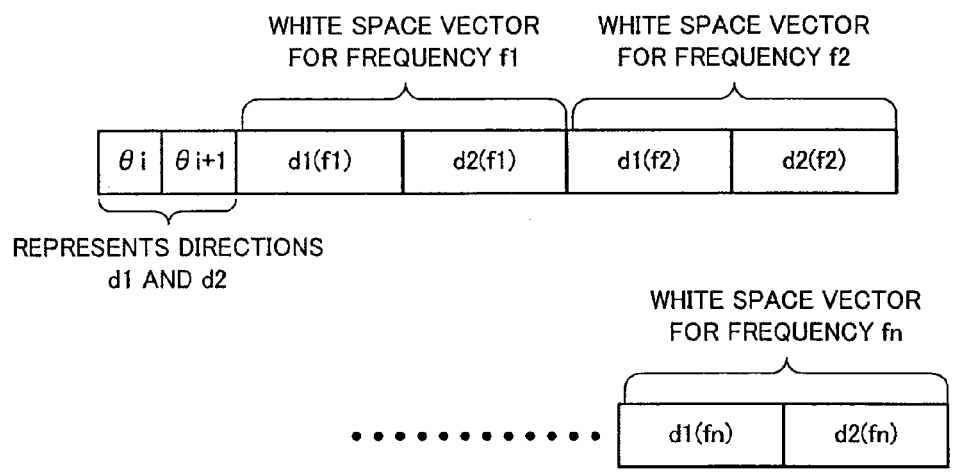
FIG. 11 is a diagram showing a data structure of white space information according to the second embodiment.

FIG. 11 shows a data structure of white space information according to the present embodiment. The present embodiment is similar to the first embodiment, in that the white space information is composed of white space vectors for each frequency, but differs in that the white space vectors only include two components ($d_1$ and $d_2$). Moreover, the white space vectors also include data ($\theta_i$ and $\theta_{i+1}$) for clarifying the directions of the two components ($d_1$ and $d_2$). If it is possible to recognize mutually between the database apparatus 10 and the vehicle 20, which are the two directions included in the white space vector, then data relating to the direction is not necessary.

The composition of the database apparatus 10 and the vehicle 20 in the present embodiment is the same as that of the first embodiment (FIG. 7) and therefore description thereof is omitted here. Furthermore, the overall flow of communications processing in the present embodiment is the same as the first embodiment (FIG. 8), and therefore description thereof is omitted here.

Figure 12A:
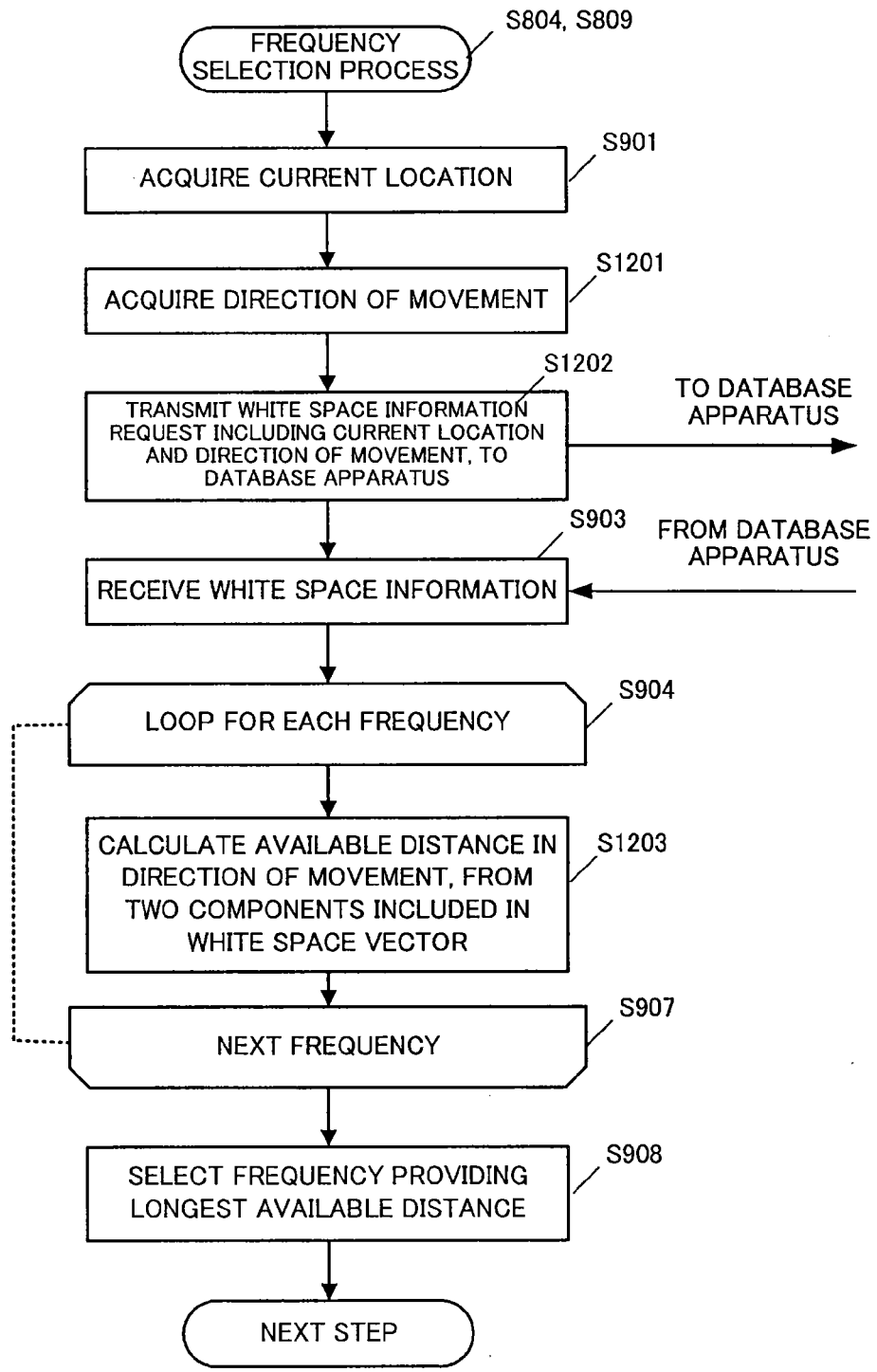
FIG. 12A is a flowchart showing details of a frequency selection process in the vehicle-mounted terminal according to the second embodiment.
Figure 12B:
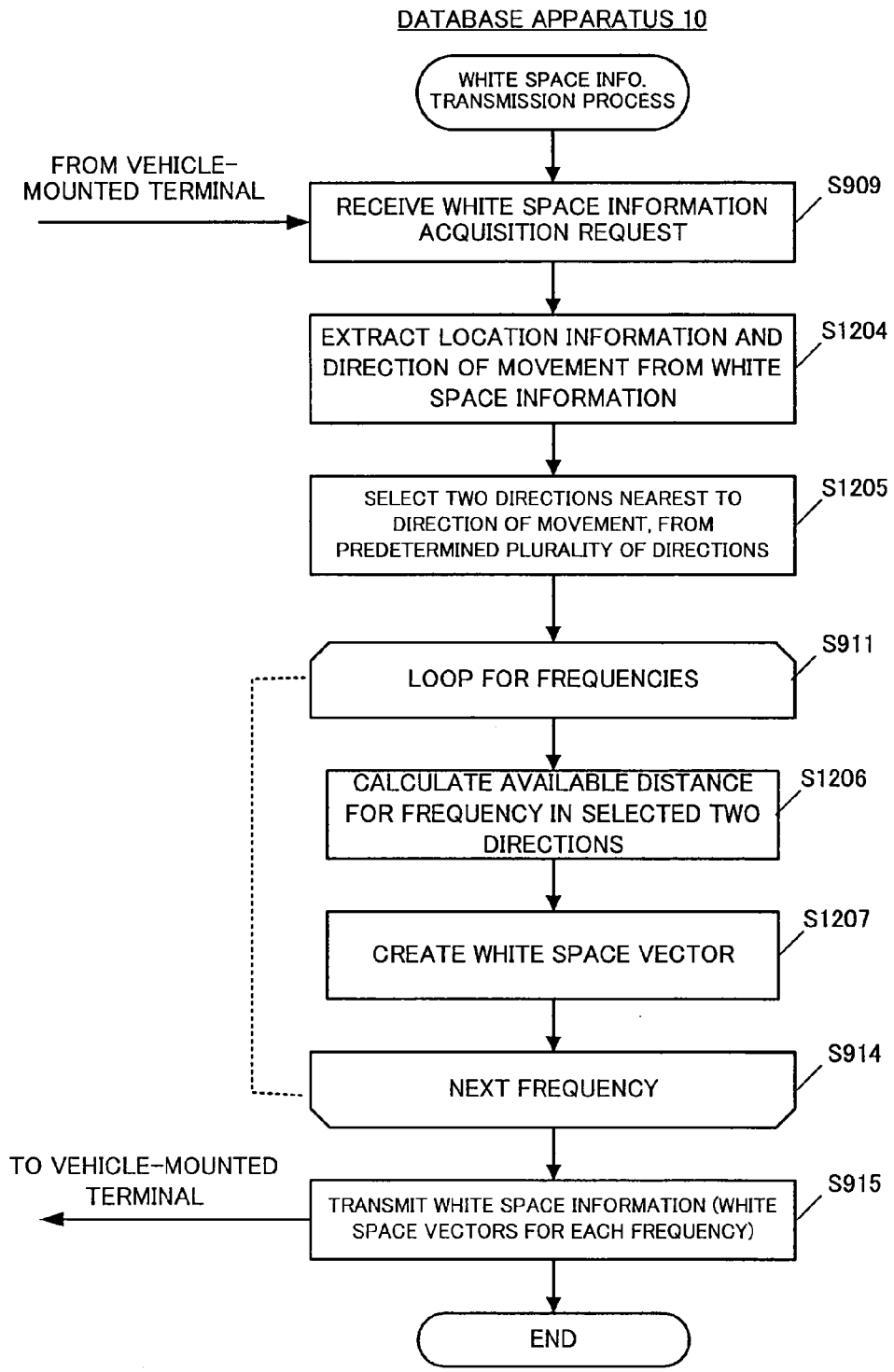
FIG. 12B is a flowchart showing a white space information generating process in a database apparatus according to the second embodiment.

FIG. 12A and FIG. 12B are respective flowcharts which show the flow of frequency selection processing in the vehicle-mounted terminal 21 and the database apparatus 10. Basically, the processing is the same as that of the first embodiment (FIG. 9A and FIG. 9B), and therefore portions which carry out the same processing are labelled with the same reference numerals and description thereof is omitted here. The description below focuses principally on the portions which are different to the first embodiment.

In the present embodiment, the vehicle-mounted terminal 21 is required to report the direction of movement of the vehicle to the database apparatus 10, as well as the current location, when there is a request for white space information. Therefore, the white space information request unit 23 acquires the direction of movement of the vehicle 20 (S1201), creates a white space information request including the current location and the direction of movement, and returns same to the database apparatus 10 (S1202).

The white space information creation unit 12 of the database apparatus 10 which has received the white space information request from the vehicle-mounted terminal 21 extracts the location information and vehicle movement direction from the white space information request (S1204). The white space information creation unit 12 then selects the two directions nearest to the direction of movement of the vehicle, from the predetermined plurality of directions (S1205). In creating a white space vector, the distances to the interference area from the location of the vehicle are calculated only in respect of the two selected directions (S1206), and a white space vector is created accordingly (S1207). White space information is created from the white space vectors for the respective frequencies determined in this way and is returned to the vehicle-mounted terminal 21.

Since the white space information transmitted from the database apparatus 10 already only includes components in the two directions near to the direction of movement of the vehicle, then in the present embodiment, there is no requirement for the vehicle-mounted terminal 21 to carry out processing for selecting components near to the direction of movement of the vehicle (step S905 in FIG. 9A). The use frequency band determination unit 24 calculates the available distance in the direction of movement by a method such as triangular interpolation, from the two components included in the white space information (S1203). The processing thereafter is similar to the first embodiment.

According to the present embodiment, the volume of communications is increased in that information on the direction of travel must be transmitted, but it is possible to reduce the volume of communications in that only two components of the white space vector are transmitted. Furthermore, since the directions which are used to calculate the distance from the vehicle position to the interference area are limited to two directions only, then it is possible to reduce the amount of calculation performed by the database apparatus 10. Furthermore, it is possible to achieve the beneficial effects of the first embodiment, while achieving further beneficial effects of this kind.

Third Embodiment

In the first and second embodiments, any interpolation method, from among triangular interpolation (FIG. 6A), elliptical interpolation (FIG. 6B) and rectangular interpolation (FIG. 6C), is employed as an interpolation method when determining the distance from the current location of the vehicle to the interference area (the available distance of the frequency). It is an object of the present embodiment to further improve the calculation accuracy of the available distance, by employing a suitable interpolation method in accordance with the circumstances.

The respective components of the white space vector each indicate the distance from the current location of the vehicle to the interference area in a prescribed direction. Here, there are two modes of the interference area which can be indicated by components in two adjacent directions, namely, a case where the two components represent distances to the same interference area, as shown in FIG. 13A, and a case where the two components represent distances to different interference areas, as shown in FIG. 13B.

Figure 13:
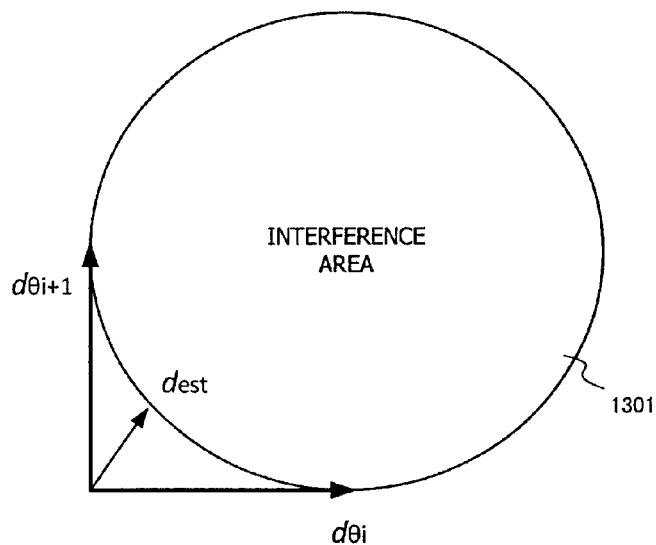
FIG. 13A is a diagram illustrating the fact that elliptical interpolation is appropriate, when the interference areas in two directions are the same area.
FIG. 13B is a diagram illustrating the fact that rectangular interpolation is appropriate, when the interference areas in two directions are different areas.
Figure 13:
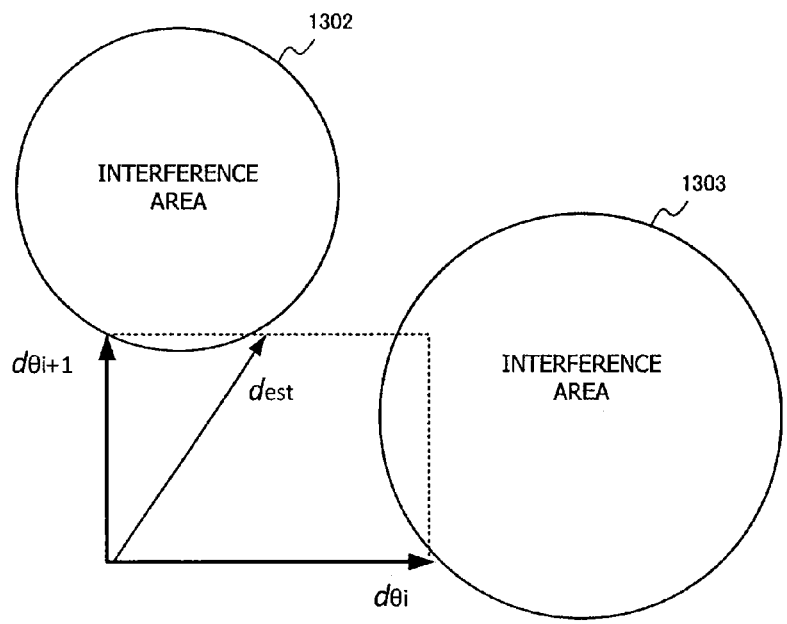

If the components in the two adjacent directions represent distances to the same interference area, as shown in FIG. 13A, then it can be seen that it is appropriate to regard the boundary between the interference area and the non-interference area at the angle therebetween as an elliptical shape. Consequently, in this case, it is appropriate to use elliptical interpolation (FIG. 6B) for calculation of the available distance.

On the other hand, if the components in the two adjacent directions represent distances to different interference areas, as shown in FIG. 13B, then it is appropriate to regard the boundary between the interference area and the non-interference area at the angle therebetween as a rectangular shape. Consequently, in this case, rectangular interpolation (FIG. 6C) is used for calculation of the available distance. In the circumstances shown in FIG. 13B, the available distance varies with the position and size of the interference area 1302 and with the direction of movement of the vehicle. For example, the available distance becomes longer if the size of the interference area 1302 is smaller than that shown in FIG. 13B, or is displaced in the leftward direction from same, or if the direction of movement of the vehicle is further towards the right ($d_{\theta i}$ direction). In this way, if there are different interference areas in the two directions, the shape of the boundary changes depending on the positional relationship therebetween, and so on. However, by assuming that the shape of the boundary is a rectangular shape, as in the present embodiment, it is also possible to calculate a suitable available distance as an average value, while avoiding excessively optimistic or pessimistic estimation.

In order to carry out the processing described above in the vehicle-mounted terminal, it is necessary for the database apparatus 10 to report to the vehicle-mounted terminal 21 whether the two adjacent components of the white space vector indicate distances to the same interference area, or distances to different interference areas. Therefore, in the present embodiment, information representing the relationship between the interference areas in adjacent directions is added to the white space information (white space vector). This information only indicates whether the interference areas in adjacent directions are the same interference area or different interference areas, and therefore, this information only requires one information bit. Below, this information is called the adjacent determination bit. For example, the adjacent determination bit indicates the same interference area, when set to a value of "0" and indicates different interference areas when set to a value of "1".

Figure 14:
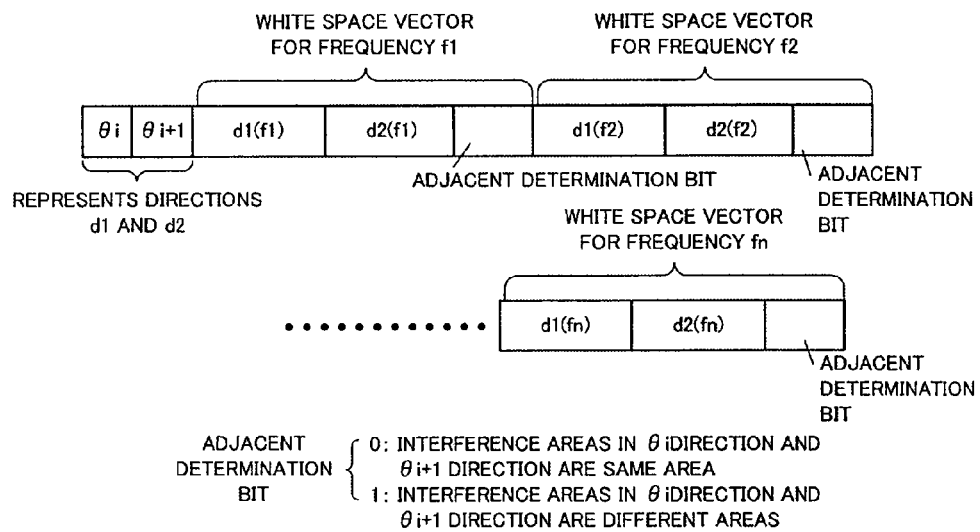
FIG. 14A and FIG. 14B are diagrams showing a data structure of white space information according to the third embodiment.
Figure 14:
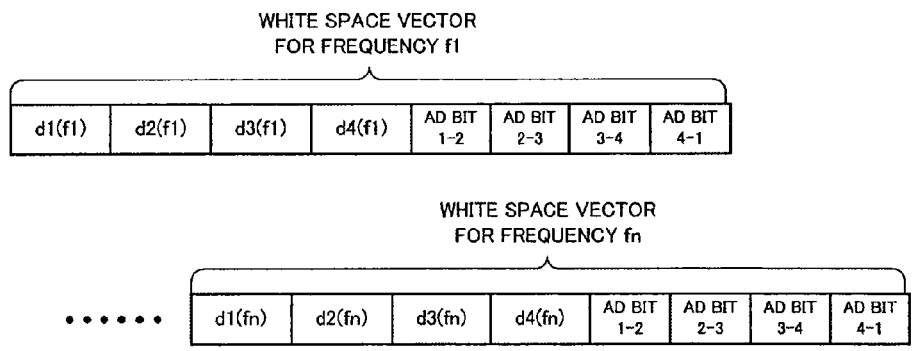

FIG. 14A and FIG. 14B are diagrams showing the data structure of white space information according to the present embodiment. FIG. 14A is an example of a case where an adjacent determination bit is added to the white space information of the second embodiment. One adjacent determination bit is added at the end of the white space vector for each frequency. As described above, in the second embodiment, the white space information stores only components for two directions nearest to the direction of movement of the vehicle, in the white space vector. Consequently, the adjacent determination bit only needs to indicate whether the interference areas in the two directions are the same or different, and hence only one bit is required for the adjacent determination bit.

FIG. 14B is an example of a case where an adjacent determination bit is added to the white space information of the first embodiment. In this example, a plurality of adjacent determination bits are added to the end of the white space vectors of the respective frequencies. In the first embodiment, all of the components of the white space vector are stored in the white space vector. Therefore, there is the same number of combinations of adjacent directions as the number of components in each white space vector. Therefore, in this example, the same number of adjacent determination bits as the number of components in the white space vector are added.

The composition of the database apparatus 10 and the vehicle 20 in the present embodiment is the same as that of the first and second embodiments (FIG. 7) and therefore description thereof is omitted here. Furthermore, the overall flow of communications processing in the present embodiment is the same as the first and second embodiments (FIG. 8), and therefore description thereof is omitted here.

Figure 15A:
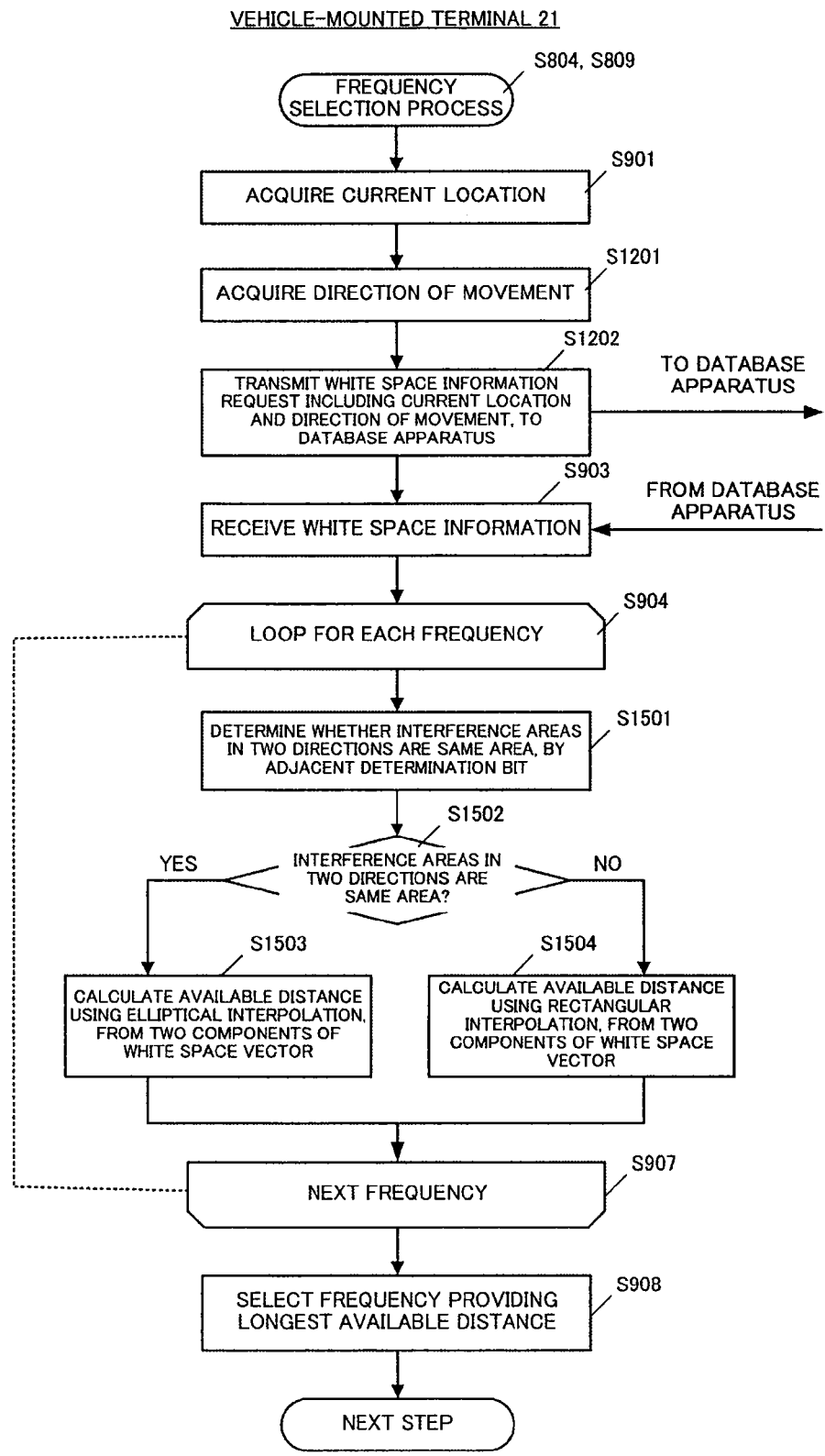
FIG. 15A is a flowchart showing details of a frequency selection process in the vehicle-mounted terminal according to the third embodiment.
Figure 15B:
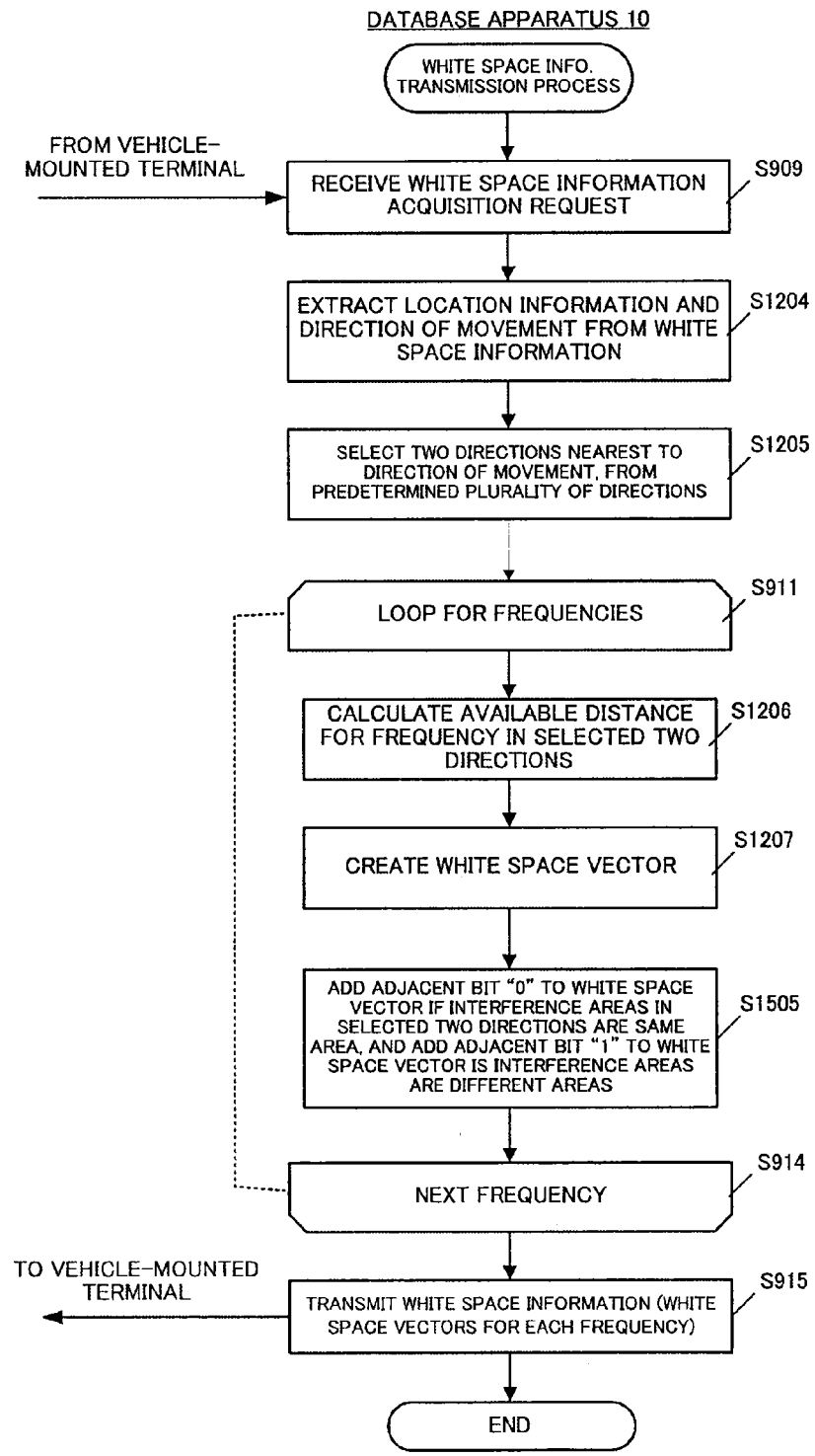
FIG. 15B is a flowchart showing a white space information generating process in a database apparatus according to the third embodiment.

FIG. 15A and FIG. 15B are respective flowcharts which show the flow of frequency selection processing in the vehicle-mounted terminal 21 and the database apparatus 10. The processing shown in FIG. 15A and FIG. 15B is based on the second embodiment, with added modifications, and therefore is basically the same as the processing in the second embodiment (FIG. 9A and FIG. 9B). Consequently, portions which carry out the same processing are labelled with the same reference numerals and description thereof is omitted here. The description below focuses principally on the portions which are different to the second embodiment.

In FIG. 15A, the processing for requesting white space information from the vehicle-mounted terminal 21 to the database apparatus 10 (steps S901, S1201 and S1202) is similar to that of the second embodiment. In FIG. 15B, in the database apparatus 10, the processing for creating white space information is substantially similar to the second embodiment, but differs in that it includes step S1505 after step S1207. In step S1505, the white space information creation unit 12 determines whether the interference areas present in the two directions selected in step S1205 are the same interference area or different interference areas, and adds an adjacent determination bit corresponding to the determination result to the white space vector. For example, if the interference areas in the two directions are the same interference area, then a value of "0" is added as an adjacent determination bit, and if the interference areas are different, then a value of "1" is added.

White space information in which an adjacent determination bit is added to each white space vector is generated as described above, and is transmitted from the database apparatus 10 to the vehicle-mounted terminal 21.

If the distances to the interference areas are stored for each of the predetermined directions in the white space vectors, as in the first embodiment, then processing for adding an adjacent determination bit is carried out for each combination of two adjacent directions.

In the vehicle-mounted terminal 21 which has received the white space information from the database apparatus 10, the available distance for each frequency is calculated as described below. Firstly, the vehicle-mounted terminal 21 refers to the adjacent determination bit added to the white space vector for a particular frequency, to determine whether or not the interference areas in the two directions included in the white space vector are the same area or different areas (S1501).

If the interference areas in the two directions are the same area (S1502—YES), then it is considered that elliptical interpolation (FIG. 6B) is appropriate as shown in FIG. 13A, and therefore the available distance for this frequency is calculated in accordance with Expression 2 (S1503).

On the other hand, if the interference areas in the two directions are different areas (S1502—NO), then it is considered that rectangular interpolation (FIG. 6C) is appropriate as shown in FIG. 13B, and therefore the available distance for this frequency is calculated in accordance with Expression 3 (S1504).

In this way, the available distances for all frequencies are calculated by using different interpolation methods depending on whether the interference areas in the two directions are the same or different. The frequency which provides the longest distance, of the calculated available distances, is selected as the frequency to be used (S908).

According to the present embodiment, by adopting an appropriate interpolation method in accordance with the relationship between the interference areas, it is possible to raise the calculation accuracy of the available distance, compared to a case where the same interpolation method is used at all times, and therefore the frequency selection processing can be carried out more accurately.

Although the volume of communications between the database apparatus 10 and the vehicle-mounted terminal 21 increases due to the addition of the adjacent determination bits, the amount of this increase is only one bit, and therefore does not present a problem. Rather, it is possible to dramatically improve the accuracy of frequency selection by means of a very small increase in the volume of communications, and therefore the improvement achieved is very great indeed in proportion to the volume of communications.

Fourth Embodiment

In the first to third embodiments described above, the available distance for the frequency is calculated based on the presumption that the vehicle is always travelling in a fixed direction. However, in actual practice, a vehicle does not travel in a straight line at all times, and changes directions. Therefore, in the present embodiment, the available distance for a frequency is calculated more accurately by also taking account of the predicted path of travel of the vehicle.

Figure 16:
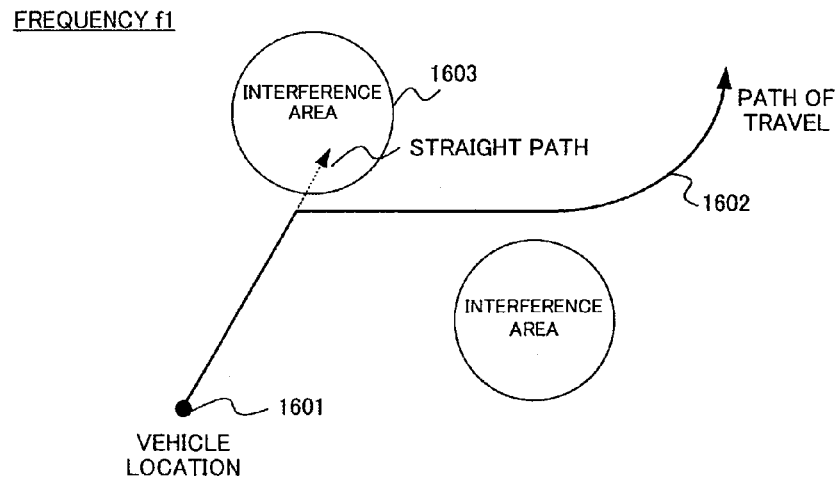
FIG. 16A and FIG. 16B are diagrams for describing the calculation of the available distance when the path of travel is not a straight line.
Figure 16:
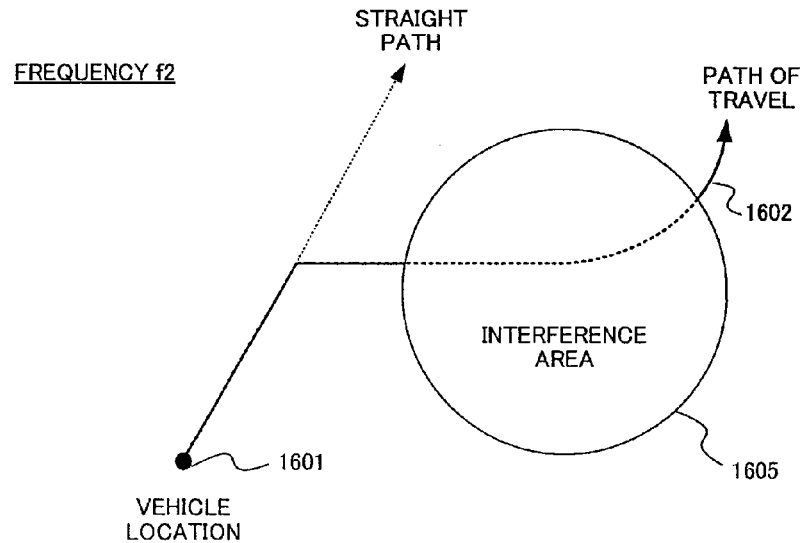

FIG. 16A and FIG. 16B are diagrams showing examples of circumstances where a problem arises if it is assumed that the direction of travel of the vehicle is fixed at all times. In FIG. 16A and FIG. 16B, point 1601 is the current location of the vehicle 20, and line 1602 is a predicted path of travel acquired from the car navigation device, or the like.

In the example shown in FIG. 16A, the vehicle 20 can actually use the frequency for a relatively long period of time, but if it is assumed that the vehicle is travelling in a straight line as in the first to third embodiments, then it is erroneously determined that the frequency becomes unavailable, upon the vehicle entering into the interference area 1603.

Conversely, in the example shown in FIG. 16B, the vehicle 20 changes directions and therefore enters into the interference area 1605, but if it is assumed that the vehicle is travelling in a straight line, then the vehicle does not enter into the interference area, and therefore it is erroneously determined that the frequency is available for a longer period than is actually possible.

Therefore, in the present embodiment, the problems of erroneous determination such as those described above are eliminated by taking the path of travel of the vehicle into account when calculating the available distances for each frequency, as described below.

Below, the method of calculating the available distances for the respective frequencies in the present embodiment is described with reference to FIG. 17, FIG. 18A and FIG. 18B. The functional composition of the database apparatus 10 and the vehicle 20 in the present embodiment is the same as that of the first to third embodiments (FIG. 7) and therefore description thereof is omitted here. Furthermore, the overall flow of the communication processing in the present embodiment is the same as that of the first to third embodiments (FIG. 8), and the white space information creation process in the database apparatus 10 is the same as that in the first to third embodiments (any one of FIG. 9B, FIG. 12B and FIG. 15B), and therefore description thereof is omitted here.

Figure 17:
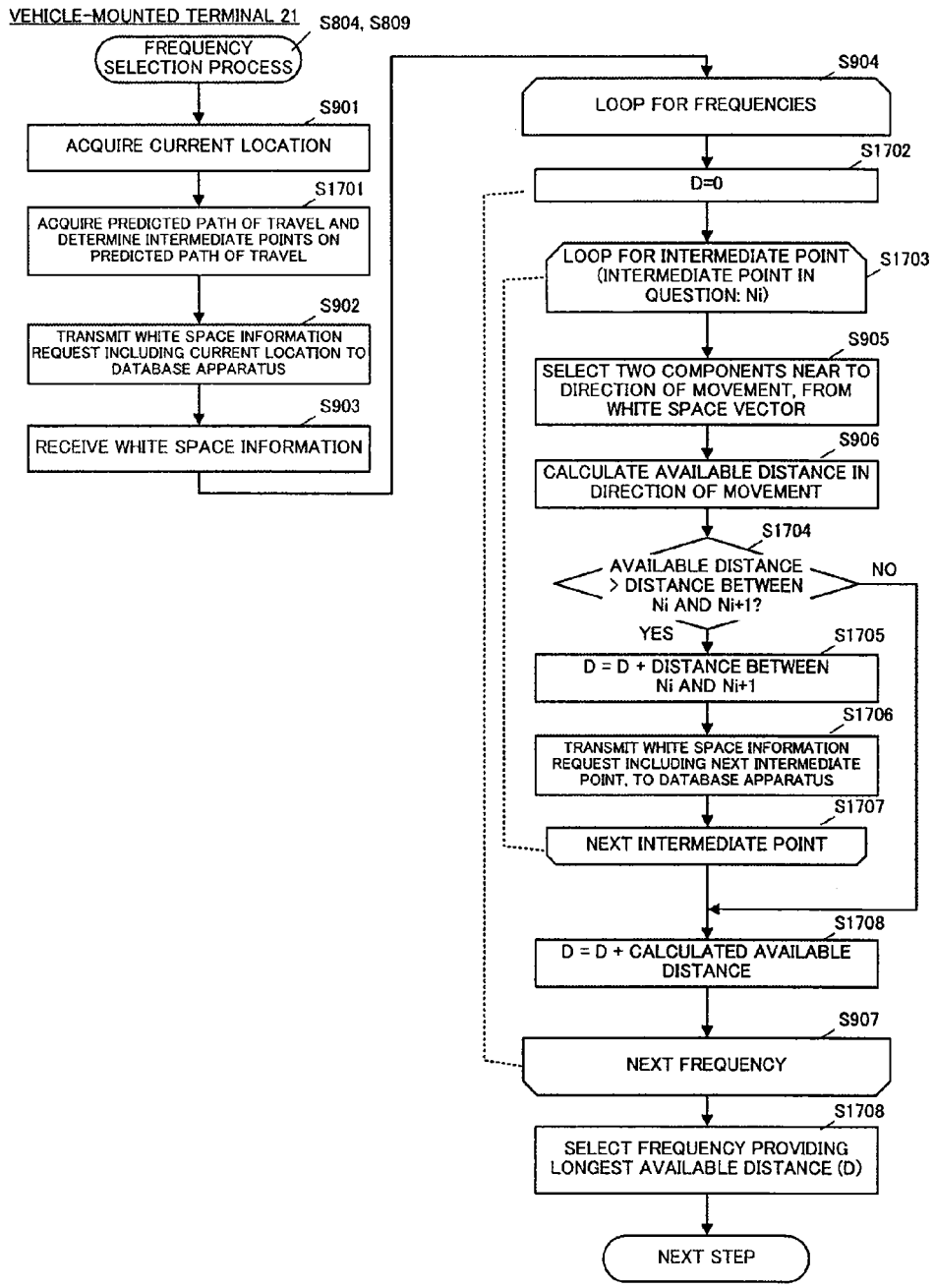
FIG. 17 is a flowchart showing details of a frequency selection process in the vehicle-mounted terminal according to the fourth embodiment.

FIG. 17 is a flowchart showing the details of a frequency selection process (step S804 and S809 in FIG. 8) in the vehicle-mounted terminal 21. Basically, the flowchart in FIG. 17 is the same as the processing of the first embodiment (FIG. 9A), and therefore portions which carry out the same processing are labelled with the same reference numerals and description thereof is omitted here. The description below focuses principally on the portions which are different to the first embodiment.

In the present embodiment, the vehicle-mounted terminal 21 acquires the current location (S901), as well as acquiring the predicted path of travel from the car navigation device, or the like, and determining an intermediate point on the path of travel (S1701). The intermediate point is a position where the vehicle 20 is regarded as changing directions, as described above, and typically is a location of a right or left turn.

Figure 18:
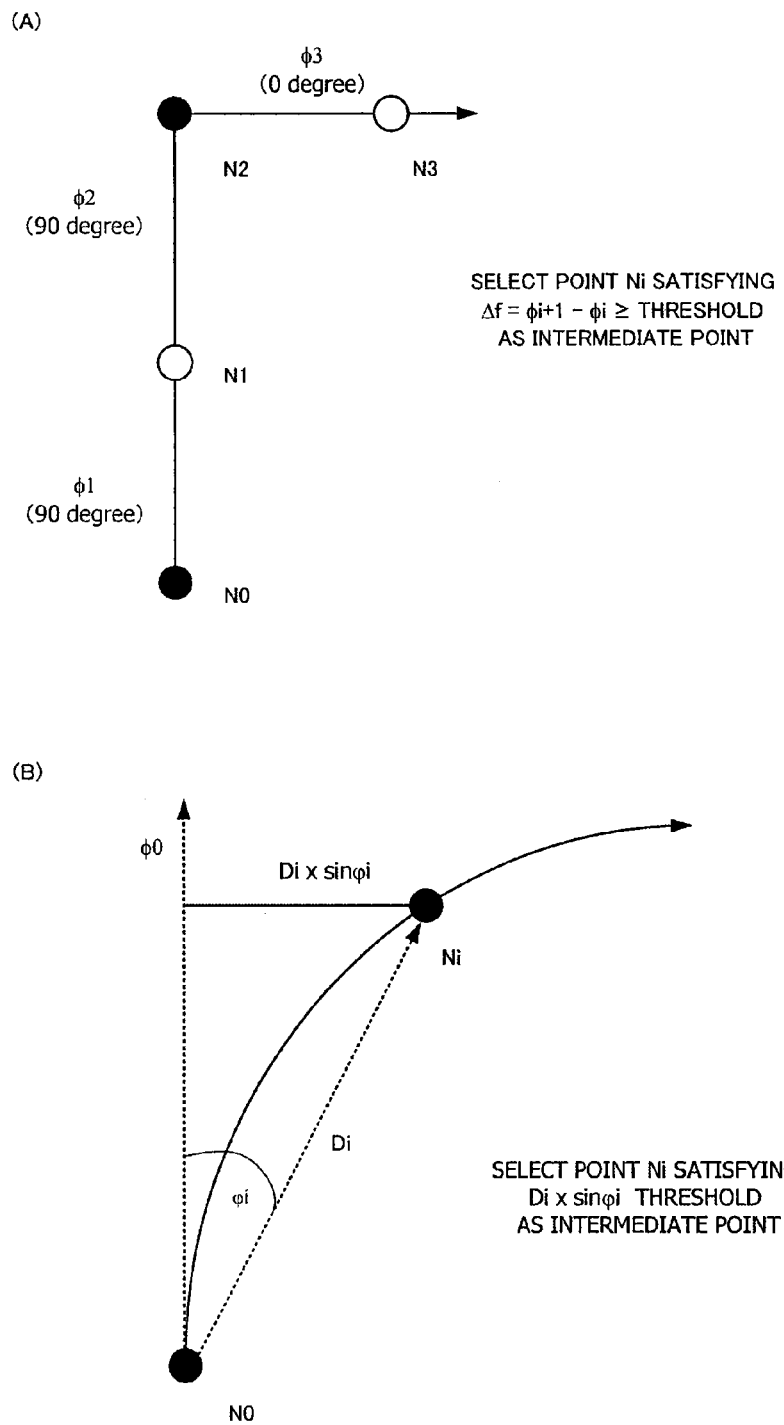
FIG. 18A and FIG. 18B are diagrams illustrating a process of setting intermediate points on a path of travel, according to the fourth embodiment.

The method of calculating an intermediate point is described here with reference to FIG. 18A and FIG. 18B. Firstly, intermediate point candidates are set at prescribed distances apart on the path of travel. In FIG. 18A, points $N_1$, $N_2$ and $N_3$ are shown as intermediate point candidates. Point $N_0$ is the current location of the vehicle 20. The direction of travel $\phi_i$ of the vehicle between two adjacent points (point $N_{i-1}$ and point $N_i$) is calculated, and a point $N_i$ where the change in the direction of travel $\phi_{i+1} - \phi_i$ is equal to or greater than a prescribed threshold value is adopted as an intermediate point.

Although intermediate points can be determined as described above, the method illustrated in FIG. 18A cannot respond to cases where the direction of travel changes gradually. Therefore, in addition to the method described above, it is desirable to determine intermediate points by the method shown in FIG. 18B. More specifically, the distance between the initial position $N_0$ and the candidate point $N_i$ is set as $D_i$, and the difference between the direction of travel at point $N_0$ and the direction from $N_0$ to point $N_i$ is $\phi_i$. A point $N_i$ where $D_i \times \sin \phi_i$ is equal to or greater than the prescribed threshold value is adopted as an intermediate point. This method can be regarded as a method that determines, as an intermediate point, any point where the actual travel position has diverged by a prescribed threshold value or more from a straight path along the direction of travel from the initial position $N_0$.

The description now returns to the flowchart in FIG. 17. The white space information request process is the same as the first embodiment, and so on. The method for calculating the available distance for each frequency (the processing of the loop in steps S904 to S907) on the basis of the white space information differs greatly from the first embodiment.

In order to determine the available distance for a particular frequency, the variable D is reset to a value of 0. This variable D ultimately represents the available distance for that frequency.

Steps S1703 to S1707 are a loop for each intermediate point. The intermediate point in question is called $N_i$, processing is focused on the intermediate point $N_i$ in question and the next intermediate point $N_{i+1}$. In the initial processing, the intermediate point in question is point $N_0$ (the current location of the vehicle).

In the processing thus far, the vehicle-mounted terminal 21 acquires white space information at point $N_i$ from the database apparatus 10. Therefore, the available distance at the current point is calculated by assuming that the vehicle is travelling in a straight line, similarly to the first embodiment, and the like (S905 and S906). In the present embodiment, the "direction of movement" in step S906 adopts the direction of movement at point $N_i$. Alternatively, if the direction of movement at point $N_i$ and the direction from point $N_i$ towards point $N_{i+1}$ are different, then the average of these directions may be adopted.

It is then determined whether or not the available distance which has been found in this way is greater than the distance between the point $N_i$ and the point $N_{i+1}$ (S1704). The distance between the point $N_i$ and the point $N_{i+1}$ may be the actual distance, or a straight-line distance, or the distance of a segment linking point $N_i$ and point $N_{i+1}$ projected in the direction of movement at point $N_i$. If the available distance found in step S906 is greater than the distance between point $N_i$ and point $N_{i+1}$, then the use frequency band determination unit 24 adds the distance between point $N_i$ and point $N_{i+1}$ to the variable D (S1705). The white space information request unit 23 requests white space information relating to the next intermediate point $N_{i+1}$, to the database apparatus 10 (step S1706). The processing described above is repeated for the next intermediate point.

If the available distance found in step S906 is equal to or less than the distance between the point $N_i$ and the point $N_{i+1}$ (S1704—NO), then the calculated available distance is added to the variable D (step S1708), and the value of the variable D after this addition is stored as the available distance for that frequency.

The processing described above is carried out repeatedly for each frequency, and the frequency providing the longest available distance is selected as the frequency to be used (S1709).

Since the available distances for the respective frequencies are calculated in this way by taking account of the predicted path of travel of the vehicle, then the available distances can be calculated more accurately. Therefore, it is possible to select a more appropriate frequency.

In the description given above, white space information for one intermediate point is acquired from a database apparatus 10, and the white space information for the next intermediate point is acquired in accordance with calculation results. However, the white space information for a plurality of intermediate points may be acquired simultaneously from the database apparatus 10. For example, the white space information for intermediate points within a prescribed distance from the current location may be acquired simultaneously, or the white space information for a prescribed number of intermediate points from the current location may be acquired simultaneously.

(Other Features)

The first to fourth embodiments described above may be combined as appropriate. The descriptions of the embodiments given above are no more than examples for explaining the present invention, and the scope of the present invention is not limited to the embodiments described above. A person skilled in the art could easily apply various modifications to the embodiments described above, in accordance with the technical concept of the present invention.

For instance, in the description given above, a vehicle-mounted communication apparatus is described as performing cognitive wireless communications with other vehicles, but the communication partner is not necessarily limited to being a vehicle, and the communication partner may be any other apparatus. Furthermore, the mobile communication apparatus is described as being a communication apparatus mounted in an automobile, but the mobile communication apparatus according to the present invention may also be a communication apparatus mounted in a body other than a vehicle, such as a train, airplane and ship, and may also be a portable communication terminal which moves due to being carried by a person, or a communication apparatus which is carried in a vehicle, or the like, and moves due to movement of the vehicle, or the like.

Furthermore, in the description given above, the frequency providing the longest available distance is selected as the frequency to be used, but the frequency selection criteria are not limited to this. In general, elements other than the available distance may be taken into account when selecting the frequency. For example, the frequency may be selected on the basis of the amount of data that can be communicated in the available time, taking account of the communication rate at each frequency (basically, this can be evaluated from the product of the available distance and the communication rate).

REFERENCE SIGNS LIST 10 database apparatus
11 wireless communication unit
12 white space information creation unit
13 interference area information storage unit
20 vehicle
21 vehicle-mounted terminal
22 wireless communication unit
23 white space information request unit
24 use frequency band determination unit
25 vehicle-to-vehicle communication apparatus
26 GPS device

The invention claimed is:

1. A frequency determination method for determining a frequency to be used for communication by a mobile communication apparatus, in a wireless communications system including a database apparatus which stores, for each frequency, a prohibited area which is an area where a licensed user is using radio waves, and the mobile communication apparatus which is capable of wireless communications with the database apparatus; the method comprising:

a step in which the mobile communication apparatus acquires location information of the mobile communication apparatus;

a step in which the mobile communication apparatus reports the location information to the database apparatus;

a step in which the database apparatus determines, for each frequency, a first distance, which is a distance in a first direction to the prohibited area from the location indicated by the reported location information, and a second distance, which is a distance in a second direction to the prohibited area from the location indicated by the reported location information, and generating distance information including the first distance and the second distance;

a step in which the database apparatus reports the distance information for each frequency, to the mobile communication apparatus; and a step in which the mobile communication apparatus determines a frequency to be used for communication, on the basis of the reported distance information and a direction of movement of the mobile communication apparatus.

2. The frequency determination method according to claim 1, wherein the step in which a frequency to be used for communication is determined includes:

an available distance calculation step of determining, for each frequency, a distance to the prohibited area in the direction of movement of the mobile communication apparatus, by interpolation on the basis of the first distance and the second distance included in the distance information; and a frequency selection step of determining, as a frequency to be used for communication, a frequency providing the longest distance, of the distances determined by the available distance calculation step.

3. The frequency determination method according to claim 2, wherein, in the available distance calculation step, the distance to the prohibited area in the direction of movement of the mobile communication apparatus is determined by assuming that a boundary of the prohibited area is a straight line linking a point distanced by the first distance in the first direction from a current location of the mobile communication apparatus, and a point distanced by the second distance in the second direction from the current location of the mobile communication apparatus.

4. The frequency determination method according to claim 2, wherein, in the available distance calculation step, the distance to the prohibited area in the direction of movement of the mobile communication apparatus is determined by assuming that a boundary of the prohibited area is an ellipse passing through a point distanced by the first distance in the first direction from a current location of the mobile communication apparatus, and a point distanced by the second distance in the second direction from the current location of the mobile communication apparatus.

5. The frequency determination method according to claim 2, wherein, in the available distance calculation step, the distance to the prohibited area in the direction of movement of the mobile communication apparatus is determined by assuming that a boundary of the prohibited area is a rectangle passing through a point distanced by the first distance in the first direction from a current location of the mobile communication apparatus, and a point distanced by the second distance in the second direction from the current location of the mobile communication apparatus.

6. The frequency determination method according to claim 2,
wherein the distance information includes information indicating whether the prohibited area in the first direction from the location indicated by the location information reported from the mobile communication apparatus and the prohibited area in the second direction from the location indicated by the location information reported from the mobile communication apparatus are the same area or different areas; and in the available distance calculation step, if the prohibited area in the first direction and the prohibited area in the second direction are the same area, the distance to the prohibited area in the direction of movement of the mobile communication apparatus is determined by assuming that a boundary of the prohibited area is an ellipse passing through a point distanced by the first distance in the first direction from a current location of the mobile communication apparatus, and a point distanced by the second distance in the second direction from the current location of the mobile communication apparatus, and if the prohibited area in the first direction and the prohibited area in the second direction are different areas, the distance to the prohibited area in the direction of movement of the mobile communication apparatus is determined by assuming that the boundary of the prohibited area is a rectangle passing through a point distanced by the first distance in the first direction from the current location of the mobile communication apparatus, and a point distanced by the second distance in the second direction from the current location of the mobile communication apparatus.

7. The frequency determination method according to claim 1,
further comprising a step in which the mobile communication apparatus reports a direction of movement of the mobile communication apparatus, to the database apparatus, wherein
two directions nearest to the direction of movement of the mobile communication apparatus are selected as the first direction and the second direction from among a previously predetermined plurality of directions.

8. The frequency determination method according to claim 7, wherein the first direction and the second direction are perpendicular to each other.

9. The frequency determination method according to claim 8, wherein the first direction and the second direction are selected from among four predetermined directions 90° apart from each other.

10. The frequency determination method according to claim 1, wherein, in the step in which distance information is generated, a distance, for each frequency, from the location indicated by the location information reported from the mobile communication apparatus to an area where the frequency is unavailable, is determined for predetermined first to fourth directions 90° apart from each other, and distance information is generated so as to include these distances.

11. The frequency determination method according to claim 1, wherein, in the step in which a frequency to be used for communication is determined, the mobile communication apparatus determines the frequency to be used for communication by also taking account of a predicted path of travel of the mobile communication apparatus.

12. The frequency determination method according to claim 11,
wherein the step in which a frequency to be used for communication is determined includes:
a step of acquiring a predicted path of movement of the mobile communication apparatus;
a step of setting an intermediate point on the predicted path of movement;
a step of acquiring distance information at the intermediate point, from the database apparatus;
a step of determining, for each frequency, a distance to a prohibited area in the direction of movement from the current location on the basis of the distance information at the current location, and if the distance exceeds a distance to a next intermediate point on the predicted path of movement, determining a distance to the prohibited area in the direction of movement from the next intermediate point on the basis of the distance information at the next intermediate point and the direction of movement at the next intermediate point, and calculating the sum of the distance from the current location of the mobile communication apparatus to the next intermediate point and the distance to the prohibited area determined at the next intermediate point, as the available distance for the frequency; and
a frequency selection step of determining, as a frequency to be used for communication, a frequency providing the longest distance, of the distances determined by the available distance calculation step.

13. A wireless communications system comprising a database apparatus and a mobile communication apparatus, the mobile communication apparatus performing communications by selecting a frequency from among available frequencies,
wherein the database apparatus includes circuitry configured to:
store, for each frequency, a prohibited area which is an area where a licensed user is using radio waves; and
determine, for each frequency and on the basis of location information reported from the mobile communication apparatus, a first distance, which is a distance in a first direction to the prohibited area from a location indicated by the reported location information, and a second distance, which is a distance in a second direction to the prohibited area from the location indicated by the reported location information, and generate distance information including the first distance and the second distance, and
the mobile communication apparatus includes circuitry configured to:
acquire location information;
report the location information to the database apparatus and acquire the distance information; and
determine a frequency to be used for communication, on the basis of the reported distance information and a direction of movement of the mobile communication apparatus.

14. The wireless communications system according to claim 13,
wherein the circuitry of the mobile communication apparatus is further configured to:
determine, for each frequency, a distance to the prohibited area in the direction of movement of the mobile communication apparatus, by interpolation on the basis of the first distance and the second distance included in the distance information; and
determine, as a frequency to be used for communication, a frequency providing the longest distance, of the determined distances.

15. A mobile communication apparatus which performs communication by determining a frequency to use on the basis of distance information reported from a database apparatus storing, for each frequency, a prohibited area which is an area where a licensed user is using radio waves, the mobile communication apparatus comprising:
  circuitry configured to:
    acquire location information;
    report the location information to the database apparatus and acquire distance information including a first distance, which is a distance in a first direction to the prohibited area from a location indicated by the location information, and a second distance, which is a distance in a second direction to the prohibited area from the location indicated by the location information; and
    determine a frequency to be used for communication, on the basis of the reported distance information and a direction of movement of the mobile communication apparatus.

16. The mobile communication apparatus according to claim 15,
  wherein the circuitry is further configured to:
    determine, for each frequency, a distance to the prohibited area in the direction of movement of the mobile communication apparatus, by interpolation on the basis of the first distance and the second distance included in the distance information; and
    determine, as a frequency to be used for communication, a frequency providing the longest distance, of the determined distances.

17. A database apparatus, comprising:
  circuitry configured to:
    store, for each frequency, a prohibited area which is an area where a licensed user is using radio waves; and
    determine, for each frequency and on the basis of location information reported from a mobile communication apparatus, a first distance, which is a distance in a first direction to the prohibited area from a location indicated by the reported location information, and a second distance, which is a distance in a second direction to the prohibited area from the location indicated by the reported location information, and generate distance information including the first distance and the second distance.

18. The database apparatus according to claim 17, wherein the circuitry is further configured to select, as the first direction and the second direction, two directions nearest to a direction of movement of the mobile communication apparatus, from among a predetermined plurality of directions, on the basis of the direction of movement reported from the mobile communication apparatus.

19. The database apparatus according to claim 18, wherein the first direction and the second direction are perpendicular to each other.

20. The database apparatus according to claim 17, wherein the circuitry is further configured to include, in the distance information, information indicating whether the prohibited area in the first direction and the prohibited area in the second direction are the same area or different areas.

* * * * *